United States Patent [19]
Shirai et al.

[11] Patent Number: 6,139,117
[45] Date of Patent: Oct. 31, 2000

[54] ELECTRICALLY OPERATED PARKING BRAKE APPARATUS HAVING BRAKING FORCE CHANGING DEVICE OPERABLE WHILE DRIVE POWER SOURCE SWITCH IS OFF

[75] Inventors: Kenji Shirai, Mishima; Yasunori Yoshino, Toyota, both of Japan

[73] Assignee: Toyota Jidosha Kabushiki Kaisha, Toyota, Japan

[21] Appl. No.: 09/266,508

[22] Filed: Mar. 11, 1999

[30] Foreign Application Priority Data

Mar. 26, 1998 [JP] Japan .................................. 10-078730

[51] Int. Cl.⁷ .............................. B60T 7/10; B60T 13/74; B60T 17/22; B60T 8/00
[52] U.S. Cl. ................................ 303/3; 188/31; 188/72.1; 188/158; 188/1.11 R; 188/162; 303/20; 303/146; 303/155
[58] Field of Search .................................... 188/72.1, 158, 188/156, 181 T, 2 D, 265, 31, 159, 161–165, 1.11 R, 162, 106 P, 1.11 E; 303/20, 112, 146, 115.2, 155, 3, 89, 13, 150; 701/48, 41

[56] References Cited

U.S. PATENT DOCUMENTS

| | | |
|---|---|---|
| 4,629,043 | 12/1986 | Matsuo et al. . |
| 4,795,002 | 1/1989 | Burgei et al. ............................ 188/162 |
| 4,865,165 | 9/1989 | Taig ........................................ 188/156 |
| 4,944,372 | 7/1990 | Taig ........................................ 188/156 |
| 5,024,299 | 6/1991 | Shaw et al. ............................. 188/156 |
| 5,107,967 | 4/1992 | Fujita et al. ........................... 188/72.1 |
| 5,219,048 | 6/1993 | Shaw et al. ............................ 188/72.1 |
| 5,219,049 | 6/1993 | Unterborn .............................. 188/162 |
| 5,370,449 | 12/1994 | Edelen et al. ............................... 303/3 |
| 5,417,624 | 5/1995 | Weissbrich et al. . |
| 5,769,189 | 6/1998 | Heibel et al. .......................... 188/156 |
| 5,785,157 | 7/1998 | Scott et al. ............................ 188/156 |
| 5,810,454 | 9/1998 | Prinzler et al. ......................... 188/158 |
| 5,823,636 | 10/1998 | Parker et al. ............................... 303/3 |
| 5,931,268 | 8/1999 | Kingston et al. ........................ 188/158 |
| 5,957,246 | 9/1999 | Suzuki ................................... 188/158 |

(List continued on next page.)

FOREIGN PATENT DOCUMENTS

| | | |
|---|---|---|
| 3444301 | 6/1986 | Germany . |
| 4129919 | 3/1993 | Germany . |
| 4129934 | 3/1993 | Germany . |
| 59-145659 | 8/1984 | Japan . |
| 4108058A | 4/1992 | Japan . |
| 5321961A | 12/1993 | Japan . |
| 6300062A | 10/1994 | Japan . |
| 7144623A | 6/1995 | Japan . |
| 8127317A | 5/1996 | Japan . |
| 8244596A | 9/1996 | Japan . |
| 1024816A | 1/1998 | Japan . |
| 11105680 | 4/1999 | Japan . |
| WO9221542 | 10/1992 | WIPO . |
| 9938738 | 8/1999 | WIPO . |

OTHER PUBLICATIONS

TEXTAR Berichte aus dem μ–Club, VXII. Internationales μ–Symposium Bremsen–Fachtagung 24./25. Oct. 1997.

*Primary Examiner*—Douglas C. Butler
*Attorney, Agent, or Firm*—Kenyon & Kenyon

[57] ABSTRACT

Electrically operated parking brake apparatus for a vehicle, including a parking brake device provided for each of at least one vehicle wheel, an electrically operated driving unit for activating the parking brake device, an operating force holding mechanism for mechanically maintaining an operating force of the parking brake device while the driving unit is off, and a parking brake control device for supplying electric power to the driving unit to activate the parking brake device and then cutting a supply of the electric power to the driving unit, for thereby applying a parking brake to the vehicle, wherein the parking brake control device includes an actual operating force changing device operable while a manually operated drive power source switch provided for turning on and off a vehicle drive power source is placed in the non-operated position, for supplying electric power to the driving unit so as to change an actual value of the operating force of the parking brake device, and then cutting a supply of the electric power from the driving unit.

34 Claims, 18 Drawing Sheets

U.S. PATENT DOCUMENTS

| | | | |
|---|---|---|---|
| 5,971,110 | 10/1999 | Martin | 188/72.1 |
| 6,000,507 | 12/1999 | Böhm et al. | 188/1.11 E |
| 6,003,640 | 12/1999 | Ralea | 188/162 |
| 6,012,556 | 1/2000 | Blosch et al. | 188/158 |
| 6,056,090 | 5/2000 | Raimann et al. | 188/162 |
| 6,079,801 | 6/2000 | Zittlau | 188/158 |

ELECTRICALLY OPERATED PARKING BRAKE APPARATUS HAVING BRAKING FORCE CHANGING DEVICE OPERABLE WHILE DRIVE POWER SOURCE SWITCH IS OFF

This application is based on Japanese Patent Application No. 10-78730 filed Mar. 26, 1988, the content of which is incorporated hereinto by reference.

BACKGROUND OF THE INVENTION

1. Field of the Invention

The present invention relates in general to an electrically operated parking brake apparatus provided on an automotive vehicle, and more particularly to techniques for improving the usage or operational flexibility of the parking brake apparatus.

2. Discussion of the Related Art

Generally, a parking brake as one of braking actions is mechanically applied to an automotive vehicle, by an operation of a parking brake lever or pedal by the operator of the vehicle. On the other hand, there is known an electrically operated parking brake apparatus for electrically applying a parking brake to the vehicle, as disclosed in JP-A-4-108058. The electrically operated parking brake apparatus requires a reduced operating force applied by the vehicle operator to the parking brake lever or pedal, in order to apply the parking brake to the vehicle.

In a mechanically operated parking brake apparatus adapted to mechanically apply a parking brake to a vehicle, the braking force (hereinafter referred to as "parking brake force") produced by a parking brake device can be increased or reduced, or the parking brake can be released, even when a drive power source switch (e.g., an ignition switch or main power source switch) is placed in a non-operated position. The drive power source switch is operated to an operated position to turn on the drive power source (e.g., an engine or electric motor) of the vehicle. However, the above-identified publication does not teach that the electrically operated parking brake apparatus is capable of increasing or reducing the actual value of the operating force of the parking brake device (parking brake force produced by the parking brake device), or releasing the parking brake, while the drive power source switch is placed in its non-operated position. While the electrically operated parking brake apparatus disclosed in the publication is advantageous, for its reduced operating force, over the conventional mechanically operated parking brake apparatus, the electrically operated parking brake apparatus suffers from a comparatively low degree of usage or operational flexibility.

In the electrically operated parking brake apparatus disclosed in the above-identified publication, all of brakes provided for front left and right wheels and rear left and right wheels of the vehicle are used as the parking brake devices. Accordingly, the total parking brake force produced by the system is relatively large even with a relatively small parking brake force produced by each parking brake device. However, the electrically operated parking brake apparatus having such an advantage is less flexible in use than the conventional mechanically operated parking brake apparatus. That is, the mechanically operated parking brake apparatus generally uses only two parking brake devices for the rear left and right wheels of the vehicle, so that the vehicle operator may positively utilize these rear parking brake devices, for permitting a quick turn of the vehicle, namely, to cause a so-called "spin turn" of the vehicle by activating the parking brake devices of the rear wheels during running of the vehicle. This way of operation of the parking brake devices cannot be accomplished in the conventional electrically operated parking brake apparatus.

SUMMARY OF THE INVENTION

It is therefore an object of this invention to provide an electrically operated parking brake apparatus for an automotive vehicle, which is improved in its usage or operational flexibility.

The above object may be achieved according to any one of the following modes of the present invention, each of which is numbered like the appended claims and depends from or refers to the other mode or modes, where appropriate, in order to indicate possible combinations of elements or features in preferred or desired forms of this invention:

(1) An electrically operated parking brake apparatus for an automotive vehicle having a drive power source, a plurality of wheels including at least one drive wheel driven by the drive power source, and a manually operated drive power source switch having an operated position in which the drive power source is in operation and a non-operated position in which the drive power source is not in operation, the parking brake apparatus comprising (a) a parking brake device provided for each of at least one of the plurality of wheels, (b) an electrically operated driving unit for activating the parking brake device with electric power, (c) an operating force holding mechanism for mechanically maintaining an operating force of the parking brake device while the electrically operated driving unit is placed in an off state with no electric power supplied thereto, and (d) a parking brake control device for supplying electric power to the electrically operated driving unit to activate the parking brake device, and then cutting a supply of the electric power from the electrically operated driving unit, for thereby applying a parking brake to the automotive vehicle, the electrically operated parking brake apparatus being characterized in that the parking brake control device comprises an actual operating force changing device operable while the drive power source switch is placed in the non-operated position, for supplying electric power to the electrically operated driving unit so as to change an actual value of the operating force of the parking brake device, and then cutting a supply of the controlled electric power from the electrically operated driving unit.

The present electrically operated parking brake apparatus is capable of changing the actual value of the operating force of the parking brake device, even while the drive power source switch is in the non-operated position. Accordingly, the present parking brake apparatus has improved usage or operational flexibility.

Further, the present electrically operated parking brake apparatus is adapted such that the actual operating force of the parking brake device can be maintained by the operating force holding mechanism without a supply of the electric power to the electrically operated driving unit, where it is not necessary to change the operating force of the parking brake device. Thus, although the actual operating force of the parking brake device can be changed by the operating force changing device by activating the electrically operated driving unit while the drive power source switch is in the non-operated position, this arrangement does not cause a considerable increase in the required amount of consumption of the electric power by the electrically operated driving unit.

The drive power source may include an engine or an electric drive motor, and the drive power source switch may include an ignition switch, a key switch or a main power source switch.

The actual operating force of the parking brake device can be increased or reduced by the actual operating force changing device. When the actual operating force is reduced to zero, the parking brake device is placed in its non-operated position in which the parking brake is completely released.

The parking brake control device may or may not be adapted to control the parking brake device while the drive power source switch is in the operated position, that is, while the drive power source is in operation.

(2) An electrically operated parking brake apparatus according to the above mode (1), further comprising a parking brake control member, and wherein the parking brake control device is responsive to an operation of the parking brake control member.

(3) An electrically operated parking brake apparatus according to the above mode (1), wherein the parking brake control device is responsive to an operation of the drive power source switch from the operated position to the non-operated position.

(4) An electrically operated parking brake apparatus according to any one of the above modes (1)–(3), wherein the parking brake control device includes power supply inhibiting means operable while the drive power source switch is in the non-operated position, for inhibiting the supply of the electric power to the electrically operated driving unit after the supply is cut, until an operation by an operator of the automotive vehicle to change the actual value of the operating force of the parking brake device is performed.

The above mode of the present invention makes it possible to change the actual operating force of the parking brake device while minimizing the required power consumption by the electrically operated driving unit, while the drive power source switch is in the non-operated position.

The electrically operated driving unit may include an electric motor, or an electrically controlled hydraulic system having a high-pressure source and an electromagentic vlave electrically controlled to control the pressure of a working fluid delivered from the high-pressure source.

(5) An electrically operated parking brake apparatus according to any one of the above modes (1)–(4), wherein the actual operating force changing device includes (a) a parking brake control member, and (b) power supply means for supplying the electric power to the electrically operated driving unit, depending upon an operation of the parking brake control member.

(6) An electrically operated parking brake apparatus according to any one of the above modes (1)–(5), wherein the actual operating force changing device includes (a) a manually operated parking brake releasing switch for zeroing the actual value of the operating force of the parking brake device, and (b) first control means for controlling the electrically operated driving unit to place the parking brake device in a non-operated position, upon an operation of the parking brake releasing switch while the drive power source switch is placed in the non-operated position.

In the parking brake apparatus according to the above mode of the invention, the parking brake device can be brought to its non-operated position to release the parking brake even while the drive power source switch is placed in the non-operated position. Accordingly, the operational flexibility of the parking brake apparatus is improved.

The manually operated parking brake releasing switch may be operated by a service person whose repairs the automatic vehicle, as well as an operator of the automotive vehicle.

The parking brake releasing switch is an example of the parking brake control member provided in the parking brake apparatus according to the above mode (5).

(7) An electrically operated parking brake apparatus according to the above mode (6), wherein the first control means is operated where the parking brake releasing switch is operated substantially simultaneously with an operation of the drive power source switch from the operated position to the non-operated position.

In the parking brake apparatus according to the above mode (7) of this invention, the parking brake device is brought to its non-operated position where the parking brake releasing switch is operated at substantially the same time when the drive power source switch is operated from the operated position to the non-operated position. This arrangement is more effective to avoid erroneous or unintended releasing of the parking brake which would take place upon an operation of a single manually operated parking brake control member.

(8) An electrically operated parking brake apparatus according to any one of the above modes (1)–(7), wherein the actual operating force changing device includes (a) a target operating force designating device for designating a target value of the operating force of the parking brake device, according to a command generated by a person, and (b) second control means for controlling the electrically operated driving unit such that the actual value of the operating force of the parking brake device while the drive power source switch is in the non-operated position is substantially equal to the target value designated by the manually operated target operating force designating device.

In the parking brake apparatus according to the above mode (8), the actual value of the operating force of the parking brake device can be changed even while the drive power source switch is in the non-operated position. Accordingly, the parking brake apparatus has improved operational flexibility.

The "command generated by a person" may be a signal generated by a member manually operated by a person, or a voice command generated by a person.

The target operating force designating device may be adapted to change the target value of the operating force either continuously or in steps.

Where the target operating force designating device includes a manually operated member for designating the target value, this manually operated member is an example of the parking brake control member provided in the above mode (5).

(9) An electrically operated parking brake apparatus according to the above mode (8), wherein the actual operating force changing device includes actual operating force holding means for holding the actual value of the operating force of the parking brake device, irrespective of a change of the target value by the target operating force designating device, until the target value of the operating force after the drive power source switch is brought to the operated position from the non-operated position has decreased to a predetermined reference value.

In the parking brake apparatus according to the above mode (9), the target operating force designating device adapted to change the target value of the operating force of the parking brake either continuously or in steps functions as a switch having a parking brake releasing position and a parking brake applying position, during a time period after the drive power source switch is brought to the non-operated position and before the target operating force designating device is operated to release the parking brake. In the conventional mechanically operated parking brake apparatus, the actual operating force of the parking brake device is abruptly reduced to zero upon operation of a parking brake operating member from its operated position to its non-operated or brake releasing position, owing to an automatic return mechanism associated with the parking brake operating member. That is, the parking brake operating member functions as a switch having the two positions indicated above. The electrically operated parking brake apparatus according to the above mode (9) has an operating feel similar to that of the conventional mechanically operated parking brake apparatus.

(10) An electrically operated parking brake apparatus according to any one of the above modes (1)–(9), wherein the actual operating force changing device is operable to change the actual value of the operating force of the parking brake device at any time while the drive power source switch is placed in the non-operated position.

In the above mode (10), the actual operating force of the parking brake device can be increased or reduced at any time while the drive power source switch is in the non-operated position. When the actual operating force is reduced to zero, the parking brake device is placed in its non-operated position in which the parking brake is completely released.

(11) An electrically operated parking brake apparatus according to any one of the above modes (1)–(9), wherein the actual operating force changing device includes power supply inhibiting means for inhibiting the supply of the electric power to the electrically operated driving unit after a predetermined time has elapsed after the drive power source switch is brought to the non-operated position.

Although the electrically operated parking brake apparatus according to the above mode (10) is capable of changing the actual value of the operating force of the parking brake device at any time while the drive power source switch is held in the non-operated position, this parking brake apparatus tends to suffer from a comparatively large amount of consumption of the electric power, since this parking brake apparatus is required to continue monitoring as to whether the actual operating force of the parking brake device need to be changed. On the other hand, the parking brake apparatus according to the above mode (11) is adapted to permit a change in the actual operating force of the parking brake device during only a predetermined limited time period after the drive power source switch is turned to its non-operated position. Thus, the present parking brake apparatus enjoys the improved operational flexibility while reducing the required power consumption by the electrically operated driving unit.

The power supply inhibiting means may be adapted to inhibit the supply of the electric power to the electrically operated driving unit until the drive power source switch is turned to the operated position.

(12) An electrically operated parking brake apparatus according to any one of the above modes (1)–(11), wherein the actual operating force changing device includes (a) a parking brake operating device, (b) actual operating force changing means operable while the drive power source switch is placed in the non-operated position, for supplying controlled electric power to the electrically operated driving unit, on the basis of an operation of the parking brake operating device, so as to change the actual value of the operating force of the parking device, and then cutting a supply of the controlled electric power from the electrically operated driving unit, and (c) power supply inhibiting means for inhibiting the supply of the controlled electric power to the electrically operated driving unit, irrespective of the operation of the parking brake operating device, after a predetermined time has elapsed after the drive power source switch is turned to the non-operated position, and until the drive power source switch is turned from the non-operated position to the operated position.

The electrically operated parking brake apparatus according to the above mode (12) has the improved operational flexibility while reducing the required amount of consumption of the electric power by the electrically operated driving unit.

(13) An electrically operated parking brake apparatus according to any one of the above modes (1)–(12), further comprising an operating force sensor for detecting the actual value of the operating force of the parking brake device, and wherein the actual operating force changing device further comprises third control means for controlling the electrically operated driving unit such that the actual value detected by the operating force sensor is substantially equal to a target value.

(14) An electrically operated parking brake apparatus according to any one of the above modes (1)–(13), wherein the actual operating force changing device comprises (a) an automatic target operating force determining device for determining a target value of the operating force of the parking brake depending upon a condition of the automotive vehicle or a road surface on which the automotive vehicle lies, and (b) fourth control means operable while the drive power source switch is placed in the non-operated position, for controlling the electrically operated driving unit such that the actual value of the operating force is substantially equal to the target value determined by the automatic target operating force determining device.

The parking brake apparatus according to the above mode (14) is less likely to suffer from a problem that the actual operating force of the parking brake is insufficient or excessive.

An electrically operated parking brake apparatus may have the feature of the above mode (14) of the invention, without the feature that the parking brake control device comprises the actual operating force changing device described above with respect to the above mode (1) of the invention.

(15) An electrically operated parking brake apparatus according to the above mode (14), wherein the automatic target operating force determining device includes (a) a vehicle speed sensor for detecting a running speed of the automotive vehicle, and (b) target operating force increasing means for increasing the target value if a determination that the automatic vehicle is not stationary is made on the basis of the running speed of the automatic vehicle detected by the vehicle speed sensor.

(16) An electrically operated parking brake apparatus according to the above mode (14) or (15), wherein the automatic target operating force determining device includes (a) a road gradient sensor for detecting a gradient angle of the road surface, and (b) target operating force determining means for determining the target value, on the basis of the gradient angle detected by the road gradient sensor, so as to prevent the automotive vehicle from moving on the road surface.

(17) An electrically operated parking brake apparatus according to any one of the above modes (1)–(16), wherein the parking brake device and the electrically operated driving unit are used for a sole purpose of applying the parking brake to the automotive vehicle.

(18) An electrically operated parking brake apparatus according to any one of the above modes (1)–(16), further comprising a brake operating member for applying a normal brake to the vehicle, and wherein the electrically operated driving unit is operated in response to an operation of the brake operating member, to activate the parking brake device for applying the normal brake.

Usually, the brake operating member is operated during running of the vehicle to apply the normal brake to the running vehicle, for stopping or decelerating the vehicle.

(19) An electrically operated parking brake apparatus according to any one of the above modes (1)–(18), wherein the electrically operated driving unit is an electric motor which generates a holding torque while the electric motor is placed in an off state with no electric power supplied thereto, and the operating force holding mechanism includes a portion of the electric motor which generates the holding torque.

(20) An electrically operated parking brake apparatus according to the above mode (19), wherein the electric motor is an ultrasonic motor.

(21) An electrically operated parking brake apparatus according to any one of the above modes (1)–(18), wherein the electrically operated driving unit includes an electric motor, and the operating force holding mechanism includes a one-way power transmitting mechanism disposed between the electric motor and the parking brake device, the one-way power transmitting mechanism permitting an output force of the electric motor to be transmitted to the parking brake device and inhibiting a force to be transmitted from the parking brake device to the electric motor.

(22) An electrically operated parking brake apparatus according to the above mode (21), wherein the one-way power transmitting mechanism includes a worm rotated by the electric motor, and a worm wheel connected to the parking brake device and engaging the worm.

(23) An electrically operated parking brake apparatus according to any one of the above modes (1)–(22), wherein the parking brake device, the electrically operated driving unit and the operating force holding mechanism are provided for each of the plurality of wheels, and the parking brake control device includes a parking brake mode selecting device for selecting one of a plurality of parking brake modes which use respective different combinations of the parking brake devices that are substantially simultaneously activated for respective ones of the plurality of wheels.

The parking brake apparatus according to the above mode (23) is improved in its operational flexibility owing to its capability to change the combination of the parking brake devices that are substantially simultaneously activated for the respective ones of the wheels.

(24) An electrically operated parking brake apparatus for an automotive vehicle having a plurality of wheels, the parking brake apparatus comprising (a) a plurality of parking brake devices provided for the plurality of wheels, respectively, (b) a plurality of electrically operated driving units for activating the parking brake devices, respectively, and (c) a parking brake control device for supplying electric power to the electrically operated driving units to activate the parking brake devices, for thereby applying a parking brake to the automotive vehicle, the parking brake apparatus being characterized in that the parking brake control device comprises a parking brake mode selecting device for selecting one of a plurality of parking brake modes which use respective different combinations of the plurality of the parking brake devices that are substantially simultaneously activated for respective ones of the plurality of wheels.

The electrically operated parking brake apparatus according to the above mode (24) has the same advantage as the apparatus according to the above mode (23), that is, improved operational flexibility owing to its capability to change the combination of the parking brake devices that are substantially simultaneously activated for the respective ones of the wheels.

The feature according to the above mode (24) may be provided together with any one of the features according to the above modes (1) through (22).

(25) An electrically operated parking brake apparatus according to the above mode (23) or (24), wherein the parking brake mode selecting device includes (a) a manually operated member for selecting one of the plurality of parking brake modes, and (b) manual type selecting means responsive to an operation of the manually operated member, for selecting the one of the plurality of parking brake modes.

In the parking brake apparatus according to the above mode (25), the vehicle operator can select the desired parking brake devices to be activated.

(26) An electrically operated parking brake apparatus according to any one of the above modes (22)–(25), wherein the parking brake mode selecting device includes (a) a vehicle motion state sensor for detecting a physical quantity representative of a motion state of the automotive vehicle, and (b) automatic type selecting means for selecting one of the plurality of parking brake modes, on the basis of the physical quantity detected by the vehicle motion state sensor.

In the parking brake apparatus according to the above mode (26), the parking brake devices that are simultaneously activated are automatically selected depending upon the condition of the vehicle.

(27) An electrically operated parking brake apparatus according to any one of the above modes (22)–(26), wherein the plurality of wheels consist of a front left wheel, a front right wheel, a rear left wheel and a rear right wheel, and the plurality of combinations include a first combination consisting of the front left and right wheels and the rear left and right wheels, and a second combination consisting of the rear left and right wheels.

In the parking brake apparatus according to the above mode (27), the vehicle can be V-turned quickly with the aid of spinning actions of the rear wheels, by selecting the second combination.

(28) An electrically operated parking brake apparatus according to the above mode (27), wherein the parking brake mode selecting device selects the second combination when the physical quantity detected by the vehicle motion state sensor indicates a desire of an operator of the automotive vehicle to spin-turn the automatic vehicle by applying a brake to each of the rear left and right wheels, and selects the first combination when the physical quantity does not indicates the desire.

In the parking brake apparatus according to the above mode (28), the second combination of the parking brake devices is automatically selected, that is, the parking brake devices for the two rear wheels are automatically activated when the vehicle motion state detected by the vehicle motion sensor indicates that the vehicle operator is desirous to spin-turn the vehicle by applying brakes to the rear wheels.

(29) An electrically operated parking brake apparatus according to the above mode (28), wherein the vehicle motion state sensor includes at least one of a steering angle sensor for detecting a steering angle of the automatic vehicle and a vehicle speed sensor for detecting a running speed of the automotive vehicle, and the parking brake mode selecting device includes determining means for determining that the operator of the automotive vehicle has the desire, if at least one of the following conditions is satisfied: 1) an absolute value of the steering angle is larger than a predetermined threshold; 2) an absolute value of a rate of change of the steering angle is higher than a predetermined threshold; and 3) the running speed of the automotive vehicle is lower than a predetermined threshold.

(30) A braking amount detecting device for detecting a braking amount relating to an operation of a braking apparatus, comprising: three sensors for detecting respective three values each representing said braking amount; and a braking amount determining means for determining if at least two values of said three values substantially simultaneously detected by said three sensors substantially coincide with each other, determining one of said at least two values or a value representing said at least two values, as a reliable value of said braking amount.

It is possible to assume that all of the three sensors for detecting respective three values of a same physical quantity or different but mutually relating physical quantities are rarely defective simultaneously, and that at least two of the three sensors are always normally functioning. On this assumption, at least two values of the above-indicated three values which substantially coincide with each other may be considered to be the values which have been accurately detected by the normally functioning at least two sensors. Based on this finding, the present braking amount detecting device is adapted to determine if at least two values of the three values substantially simultaneously detected by the respective three sensors substantially coincide with each other, and estimate that the at least two values substantially coinciding with each other are the values accurately detected by the normally functioning sensors. Based on this estimation, one of these at least two values or a value representing these at least two values is determined as a reliable value of the braking amount relating to the operation of the braking apparatus.

The braking amount relating to the operation of the braking apparatus may be selected from among the following physical quantities: an operating force acting on a brake operating member such as a brake pedal; an operating stroke of such a brake operating member; a negative pressure in a vacuum booster disposed between a brake operating member and a braking device such as a disc brake; a hydraulic pressure in a master cylinder disposed between the brake operating member and such a braking device; a hydraulic pressure in a wheel brake cylinder used in a braking device such as a disc brake; a deceleration value of an automotive vehicle on which the braking apparatus is provided; a yaw rate of the vehicle; and a lateral acceleration value of the vehicle.

Where the braking apparatus is used on an automotive vehicle, the sensors may be selected from among the following sensors: a stroke sensor such as a sensor for detecting the operating stroke of the above-indicated brake operating member; a force sensor such as a sensor for detecting the operating force acting on the brake operating member; a pressure sensor such as a sensor for detecting the pressure in the master cylinder, vacuum booster or wheel brake cylinder, as indicated above; a velocity sensor such as a sensor for detecting the running speed or yaw rate of the vehicle; and acceleration or deceleration sensor for detecting the acceleration or deceleration of the vehicle body.

The feature according to the above mode (29) of the present invention may be provided together with any one of the feature according to the above modes (1) through (29).

(31) A braking amount detecting device according to the above mode (30), wherein said value representing by said at least two values of said three values is an average of said at least two values.

(32) A braking amount detecting device according to the above mode (30) or (31), wherein said three values detected by said three sensors, respectively, consist of three values of a same physical quantity In the detecting device according to the above mode (32), the three sensors may consist of three stroke sensors all of which are adapted to detect the operating stroke of the brake operating member, for example. Alternatively, all of the three sensors may be adapted to detect the hydraulic pressure in the master cylinder.

(33) A braking amount detecting device according to the above mode (30) or (31) wherein said three values detected by said three sensors, respectively, include at least two values of different physical quantities which relate to each other.

In the detecting device according to the above mode (33), the three sensors may consist of a stroke sensor for detecting the operating stroke of the brake operating member, a force sensor for detecting the operating force acting on the brake operating member, and a pressure sensor for detecting the hydraulic pressure in the master cylinder. Alternatively, the three sensors may consist of the stroke sensor, the master cylinder pressure sensor and a deceleration sensor for detecting the deceleration value of the vehicle.

(34) An electrically operated parking brake apparatus for an automotive vehicle having a drive power source, a plurality of wheels including at least one drive wheel driven by said drive power source, and a manually operated drive power source switch having an operated position in which said drive power source is in operation and a non-operated position in which said drive power source is not in operation, said parking brake apparatus comprising (a) a parking brake device provided for each of at least one of said plurality of wheels, (b) an electrically operated driving unit for activating said parking brake device, and (c) a parking brake control device for supplying electric power to said electrically operated driving unit to activate said parking brake device, for thereby applying a parking brake to the automotive vehicle, the electrically operated parking brake apparatus being characterized in that said parking brake control device comprises an actual operating force changing device operable while said drive power source switch is placed in said non-operated position, for supplying electric power to said electrically operated driving unit so as to change an actual value of an operating force of said parking brake device.

The electrically operated parking brake apparatus according to the above mode (34) is capable of changing the actual value of the operating force of the parking brake device, even while the drive power source switch is in the non-operated position. Accordingly, the present parking brake apparatus has improved the usage or operational flexibility.

BRIEF DESCRIPTION OF THE DRAWINGS

The above and optional objects, features, advantages and technical and industrial significance of the present invention will be better understood by reading the following detailed description of presently preferred embodiments or forms of the invention, when considered by reference to the accompanying drawings.

DETAILED DESCRIPTION OF THE PREFERRED EMBODIMENTS

Figure 1:
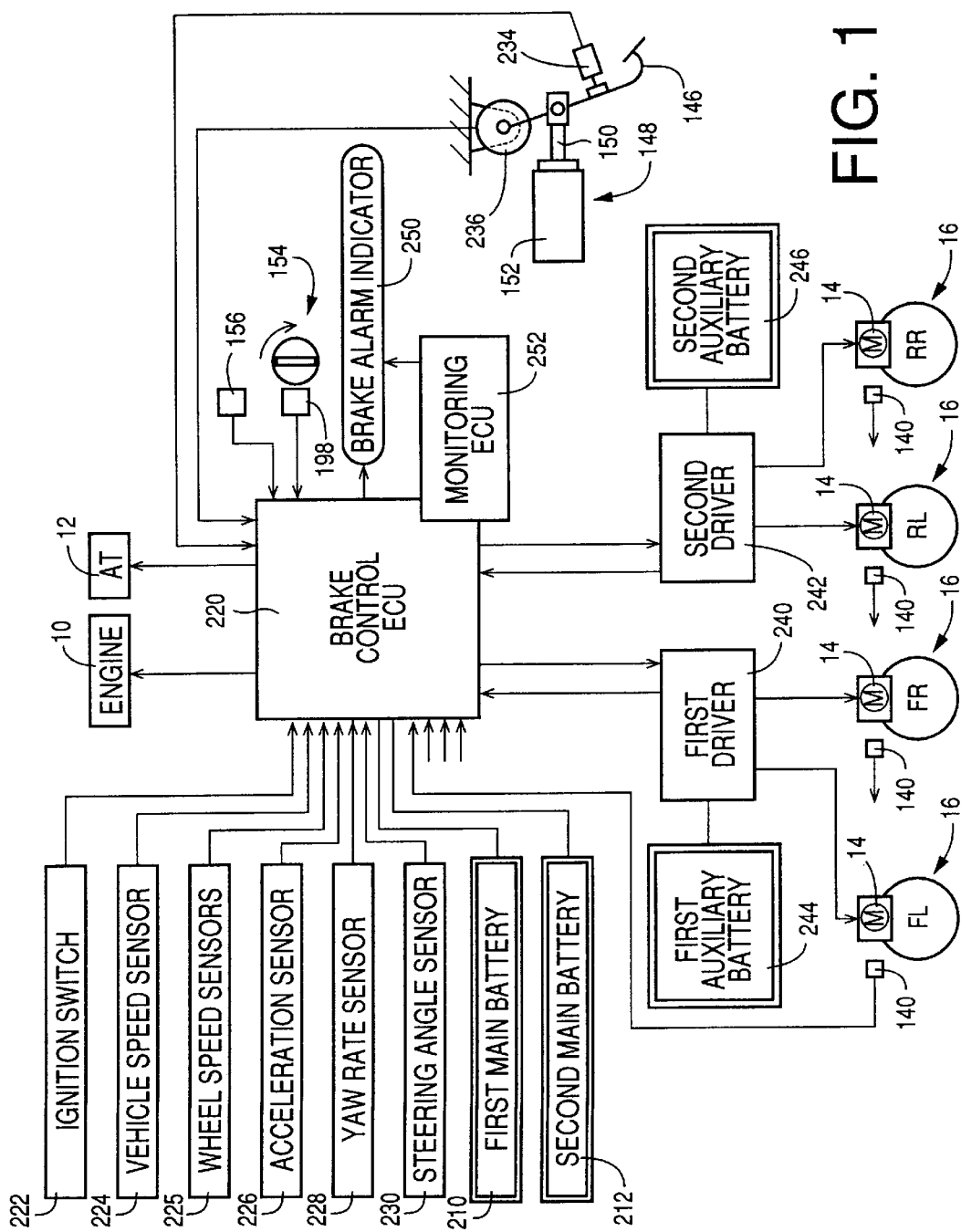
FIG. 1 is a schematic view showing a braking system of an automotive vehicle including an electrically operated parking brake apparatus constructed according to a first embodiment of this invention.

Referring first to FIG. 1, the braking system shown therein includes an electrically operated parking brake apparatus constructed according to a first embodiment of the present invention. This braking system is designed for a four-wheel automotive vehicle having a front left wheel FL, a front right wheel FR, a rear left wheel RL and a rear right wheel RR. The vehicle is equipped with an engine (internal combustion engine) 10, and a power transmitting device in the form of an automatic transmission 12 (abbreviated as "AT" in FIG. 1). A power is transmitted from the engine 10 through the automatic transmission 12 to at least one of the two pairs of wheels consisting of the front pair FL, FR and the rear pair RL, RR.

The braking system has four electrically operated parking brake devices in the form of disc brakes 16 for the respective four wheels FL, FR, RL, RR. As a drive source for operating each of these disc brakes 16, there is provided an electrically operated driving unit in the form of an ultrasonic motor 14. Thus, the disc brake 16 does not use a hydraulic pressure. Each disc brake 16 is selectively used as a normal brake or a parking brake. One of the four disc brakes 16 is shown in detail in FIG. 2.

The electrically operated disc brake 16 includes a disc rotor 17 as a rotor rotating with the corresponding wheel of the vehicle. The disc rotor 17 has two opposite major surfaces serving as friction surfaces 18a, 18b, and two brake pads 20a, 20b disposed so as to be opposed to the respective friction surfaces 18a, 18b. Each brake pad 20 consists of a friction member 22 for frictional contact with the corresponding friction surface 18a, 18b, and a backing plate 22 made of a steel material and fixed to the back surface of the friction member 22.

The disc brake 16 includes a pad support mechanism 26 and a pad pressing mechanism 28. The pad support mechanism 26 will be explained first.

The disc brake 16 has a mounting bracket 30 attached to the vehicle body in a cantilever fashion so as to extend over the periphery of the disc rotor 17. The mounting bracket 30 includes (a) a support portion supporting the two brake pads 20a, 20b on the opposite sides of the disc rotor 17 such that the brake pads 20*a*, 20*b* are movable in a Y-axis direction perpendicular to the friction surfaces 18*a*, 18*b*, and (b) a torque receiving portion for receiving friction forces from the brake pads 20*a*, 20*b* during frictional contact of these brake pads with the friction surfaces 18*a*, 18*b*. Thus, the mounting bracket 30 serves as the pad support mechanism 26.

The pad pressing mechanism 28 will be explained next.

The disc brake 16 has a caliper 60 consisting of a caliper body 61 and a motor housing 80 which are screwed to each other. The motor housing 80 will be described below. The caliper body 61 includes a pad pressing portion 60*a*, a motor mounting portion 60*b* and a supporting portion 60*c*, which are formed integrally with each other. The caliper body 61 further includes an integrally formed pair of arms (not shown) extending in the Y-axis direction in which the brake pads 20*a*, 20*b* are movable.

The caliper body 61 is supported at its pad pressing portion 60*a* by the mounting bracket 30 such that the caliper body 61 is slidably movable in the Y-axis direction. Thus, the caliper 60 is of a floating type. Two pins are attached to each of the arms indicated above, so as to extend in the Y-axis direction. These two pins engage the mounting bracket 30 slidably in the Y-axis direction. In this arrangement, the caliper body 61 is slidably supported by the mounting bracket 30, with its pad pressing portion 60*a* engaging the two pins.

The pad pressing portion 60*a* consists of a presser portion 64, a reaction portion 66 and a connecting portion 68 which are formed integrally with each other such that the presser portion 64 and the reaction portion 66 are connected by the intermediate connecting portion 68. The presser portion 64 is located on the inner side of the disc rotor 16, namely, adjacent to the backing plate 24 of the inner pad 20*b*, while the reaction portion 66 is located on the outer side of the disc rotor 16, namely, adjacent to the backing plate 24 of the outer pad 20*a*.

The presser portion 64 has a bore in which presser member in the form of a presser piston 70 is slidably received such that the presser piston 70 is movable toward and away from the inner pad 20*b*. Behind the presser piston 70, there is disposed the ultrasonic motor 14 indicated above, such that the ultrasonic motor 14 is coaxial or concentric with the presser piston 70 and such that the axes of the ultrasonic motor 14 and the presser piston 70 extend in the Y-axis direction. The ultrasonic motor 14 and the presser piston 70 are connected to each other by a motion converting mechanism in the form of a ballscrew mechanism 74, which also serves as a one-way power transmitting mechanism.

The ultrasonic motor 14, which is of a travelling wave type, has a stator 82 and a rotor 84. In operation, the stator 82 is subjected to a ultrasonic vibration, to generate a surface wave, and the rotor 84 is rotated with a friction force acting between the stator 82 and the rotor 84, as well known in the art. The stator 82 and the rotor 84 are coaxially accommodated within the above-indicated motor housing 80 which is a cylindrical structure having an open end and a closed end. The stator 82 consists of an elastic body 90 and a piezoelectric body 82 which are superposed on each other.

The motor housing 80 consists of a body portion 80*a* having a through-hole, and a closure portion 80*b* closing an open end of the through-hole. These body portion 80*a* and the closure portion 80*b* are fixed together by screws. The motor housing 80 is screwed, at its open end remote from the closure portion 80*b*, to the above-indicated motor mounting portion 60*b* of the caliper 60.

The rotor 84 is held onto the stator 82 by a pressure mechanism 94, so as to maintain a required friction force between the rotor 84 and the stator 82. The rotor 84 has a friction member or material held in contact with the stator 82, so that the travelling wave generated by the stator 82 is transferred to the rotor 84, whereby the rotor 84 is rotated. In the presence of the pressure mechanism 94, a certain amount of friction force is present between the stator 82 and the rotor 84, enabling the ultrasonic motor 14 to produce a holding torque, while the piezoelectric body 92 is in a non-energized state, that is, while the motor 14 is in an OFF state.

The ballscrew mechanism 74 includes an externally threaded member 100, and an internally threaded member 102 which engages the externally threaded member 100 through a plurality of balls (not shown). The externally threaded member 100 is axially movable, but is not rotatable. On the other hand, the internally threaded member 102 is rotatable, but is not axially movable.

The externally threaded member 100 has a splined portion 103 splined to a splined portion of the motor housing 80 such that the externally threaded member 100 is not rotatable relative to the motor housing 80.

Figure 2:
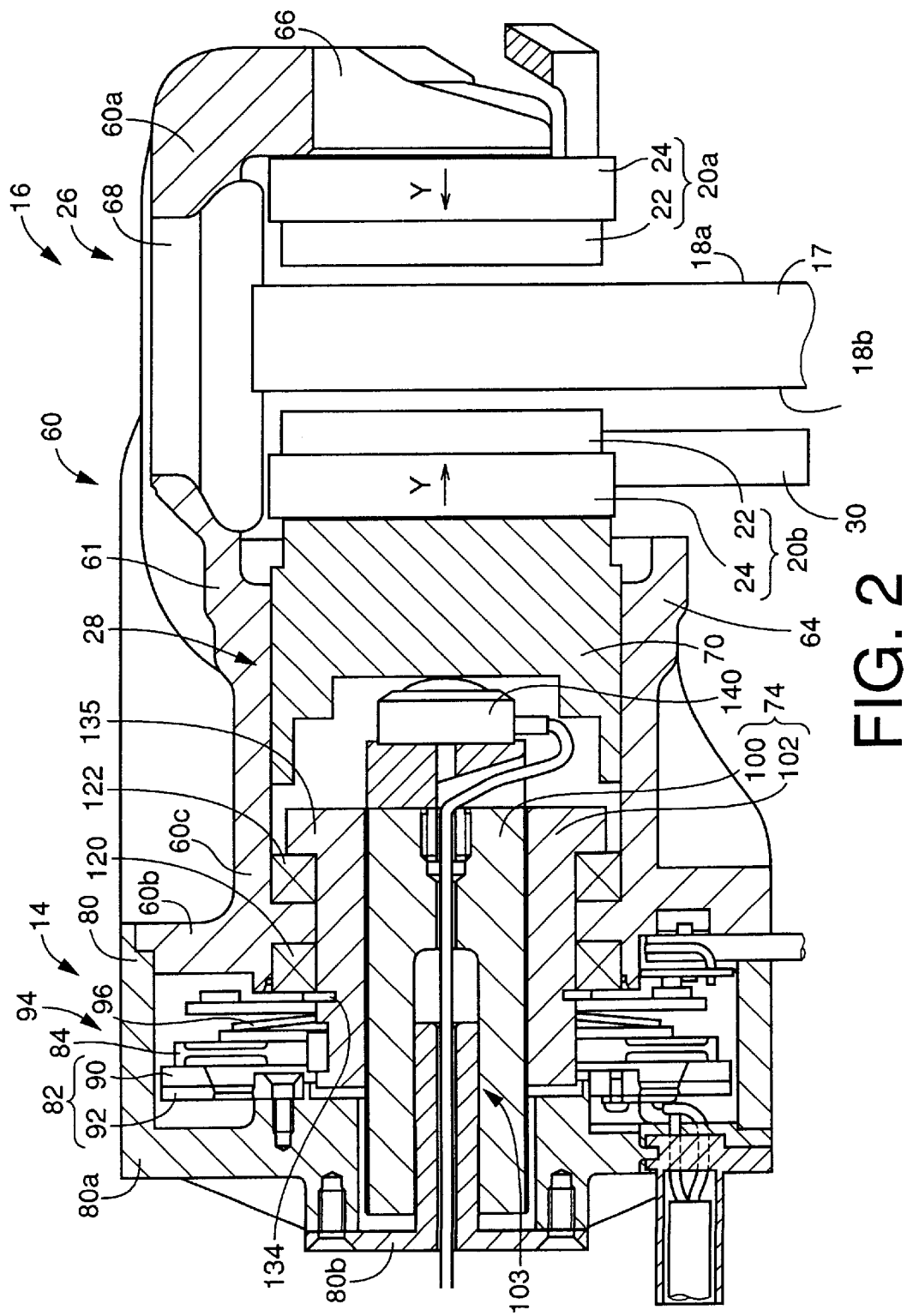
FIG. 2 is a side elevational view in cross section of an electrically operated disc brake in the braking system of FIG. 1.

On the internally threaded member 102, there are mounted the rotor 84 and the pressure mechanism 94 such that the internally threaded member 102 is rotated with the rotor 84. Accordingly, a forward rotation of the internally threaded member 102 with the rotor 84 causes an advancing movement of the externally threaded member 100 (in the rightward direction as seen in FIG. 2), thereby moving the presser piston 70 so as to press the inner pad 20*b* onto the inner friction surface 18*b* of the disc rotor 17. On the other hand, a reverse rotation of the internally threaded member 102 with the rotor 84 causes a retracting movement of the externally threaded member 100 (in the leftward direction as seen in FIG. 2), thereby permitting the presser piston 70 and the inner pad 20*b* in the direction away from the inner friction surface 18*b*.

The internally threaded member 102 is rotatably supported by the supporting portion 60*c* of the caliper body 61, via a radial bearing 120 and a radial thrust bearing 122 which are spaced apart from each other in their axial direction. The internally threaded member 102 has a retainer ring 134 engaging an annular groove formed in its outer circumferential surface. The retainer ring 134 cooperates with a large-diameter portion 135 of the internally threaded member 102 to grip the radial bearing 120, the motor mounting portion 60*b* and the radial thrust bearing 122 therebetween, so that axial movements of the internally threaded member 102 are prevented.

The externally threaded member 100 carries a load sensor 140 coaxially attached to its front end, so that the externally threaded member 100 engages the back surface of the pressure piston 70 through the load sensor 140. In this arrangement, a pressing force by which the inner pad 20*b* is pressed against the disc rotor 17 by activation of the ultrasonic motor 14 can be detected on the basis of an output signal of the load sensor 140.

Figure 21:
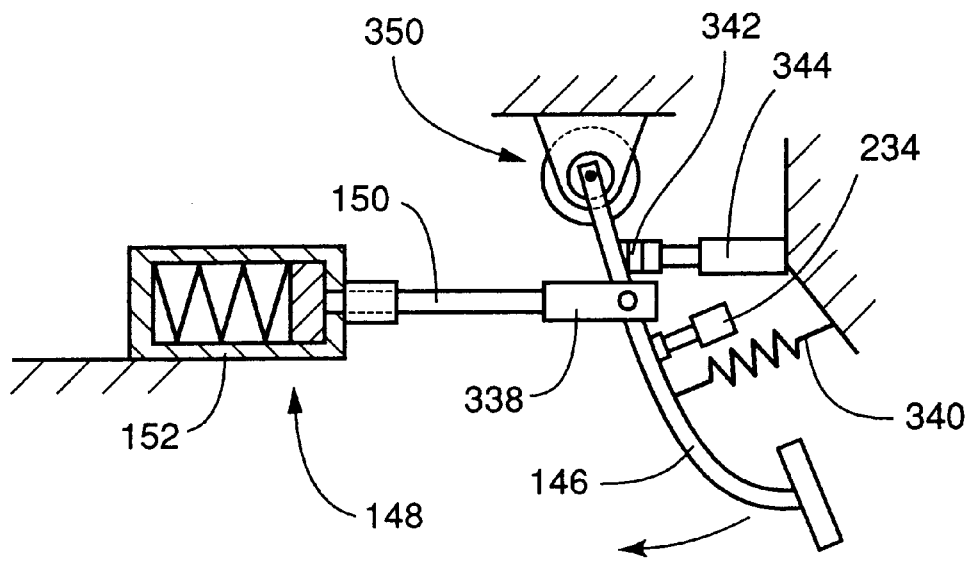
FIG. 21 is a side elevational view showing a brake pedal and its vicinity in a braking system including an electrically operated parking brake apparatus according to an eighth embodiment of this invention.

Referring back to FIG. 1, the present braking system has a normal brake operating device, which includes a normal brake operating member in the form of a brake pedal 146 pivotally attached to the vehicle body. The brake pedal 146 is connected to a reaction force generating mechanism 148, which generates a reaction force upon depression of the brake pedal 146, such that the reaction force changes with an operating stroke of the brake pedal 146. The reaction force generating mechanism 148 includes a housing 152 closed at one end thereof, a link member 150 connected at one end thereof to the brake pedal 146 and axially slidably engaging the other end portion of the housing 152, and a compression coil spring (not shown) disposed within the housing 152 and between the bottom wall of the housing 152 and the other end of the link member 150. A reference is made to FIG. 21 showing the reaction force generating mechanism 148 provided in an eighth embodiment of this invention (which will be described). The spring produces the reaction force to be applied to the operated brake pedal 146, depending upon the operating stroke of the brake pedal 146.

The present braking system further has a parking brake operating device, which includes a parking brake operating device 154 of rotary type, and a parking brake releasing switch 156. these device 154 and switch 156 both serve as a parking brake control member.

Figure 3:
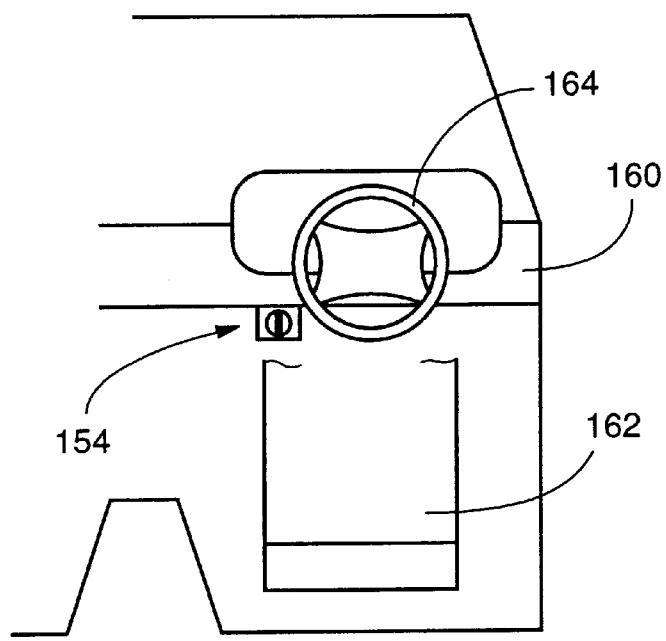
FIG. 3 is a front elevational view for explaining the position at which a parking brake operating device is installed on the vehicle.

The parking brake operating device 154 is provided in place of a parking brake lever or pedal usually used in the conventional mechanically operated parking brake apparatus. This parking brake operating device 154 is operated by the vehicle operator, to apply command signals to an electronic brake control unit 220 (abbreviated as "BRAKE CONTROL ECU" in FIG. 1). The command signals indicate whether application of a parking brake to the vehicle is required or not, and represent a desired braking force generated by the parking brake apparatus. As shown in FIG. 3, the parking brake operating device 154 is attached to an instrument panel 160, such that the device 154 is easily accessible by the vehicle operator sitting on an operator's seat 162. Reference numeral 164 in FIG. 3 denotes a steering wheel of the vehicle.

The parking brake releasing switch 156 is operated to release the parking brake when the vehicle cannot be run by itself and need to be run by another automotive vehicle. In this embodiment, this switch 156 is disposed within an engine compartment of the vehicle. However, the switch 156 may be located at a position easily accessible by the vehicle operator sitting on the operator's seat 162.

The parking brake operating device 154 will be described in detail, by reference to the front and side elevational elevational views of FIGS. 4 and 5.

Figure 4:
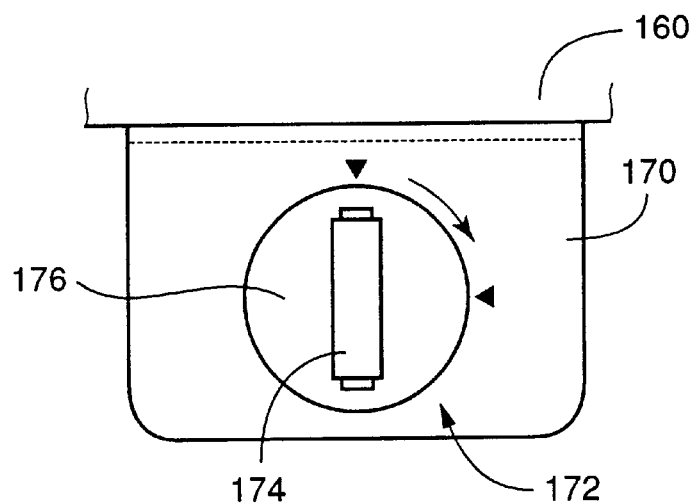
FIG. 4 is a front elevational view of the parking brake operating device.
Figure 5:
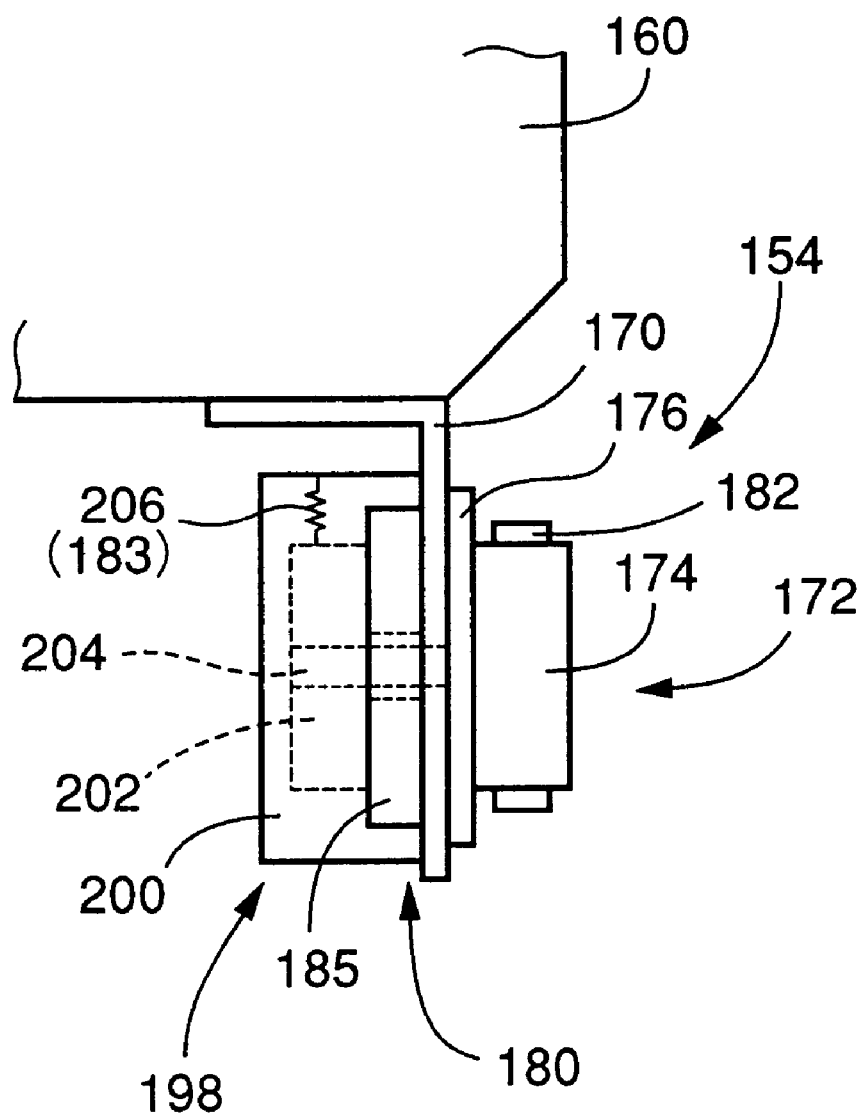
FIG. 5 is a side elevational view of the parking brake operating device.

As shown in FIGS. 4 and 5, the parking brake operating device 154 includes a mounting bracket 170 attached to the instrument panel 160. The mounting bracket 170 has a downwardly extending plate portion to which a rotary operating member 172 is attached rotatably about an axis extending in the longitudinal or running direction of the vehicle. The operating member 172 has a knob 174 to be finger-gripped by the vehicle operator, and a circular disc 176 formed integrally with the knob 174. The knob 174 has a generally rectangular shape as seen in FIG. 4, extending in a diametric direction of the circular disc 176. The angular position of the operating member 172 relative to the mounting bracket 170 is changed by rotating the operating member 172 such that the upper end of the knob 174 (as seen in FIG. 4) is moved relative to two markings provided on the mounting bracket 170. The parking brake is released when the upper end of the knob 174 is aligned with one of the two markings, as shown in FIG. 4. With the upper end of the knob 174 aligned with the other marking, the braking force (hereinafter referred to as "parking brake force") generated by the parking brake apparatus is maximum.

To give the parking brake operating device 154 an operating feel as given by a parking brake level or pedal of the conventional mechanically operated parking brake apparatus, the parking brake operating device 154 includes a ratchet mechanism 180, a reset pushbutton 182, and an automotive return mechanism 183, as shown in FIG. 5. The operating member 172 can be rotated in a direction of increasing the parking brake force, without an operation of the reset pushbutton 182, such that the required operating force increases with an increase in the angle of rotation of the operating member 172 to increase the parking brake force. On the other hand, the operating member 172 is prevented by the ratchet mechanism 180 from being rotated in the reverse direction of reducing the parking brake force, unless the reset pushbutton 182 is operated. That is, the operating member 172 can be rotated in this reverse direction while the reset pushbutton 182 is kept depressed. Further, the automatic return mechanism 183 functions to automatically return the operating member 172 in the reverse direction to the non-operated or parking brake release position.

Figure 6:
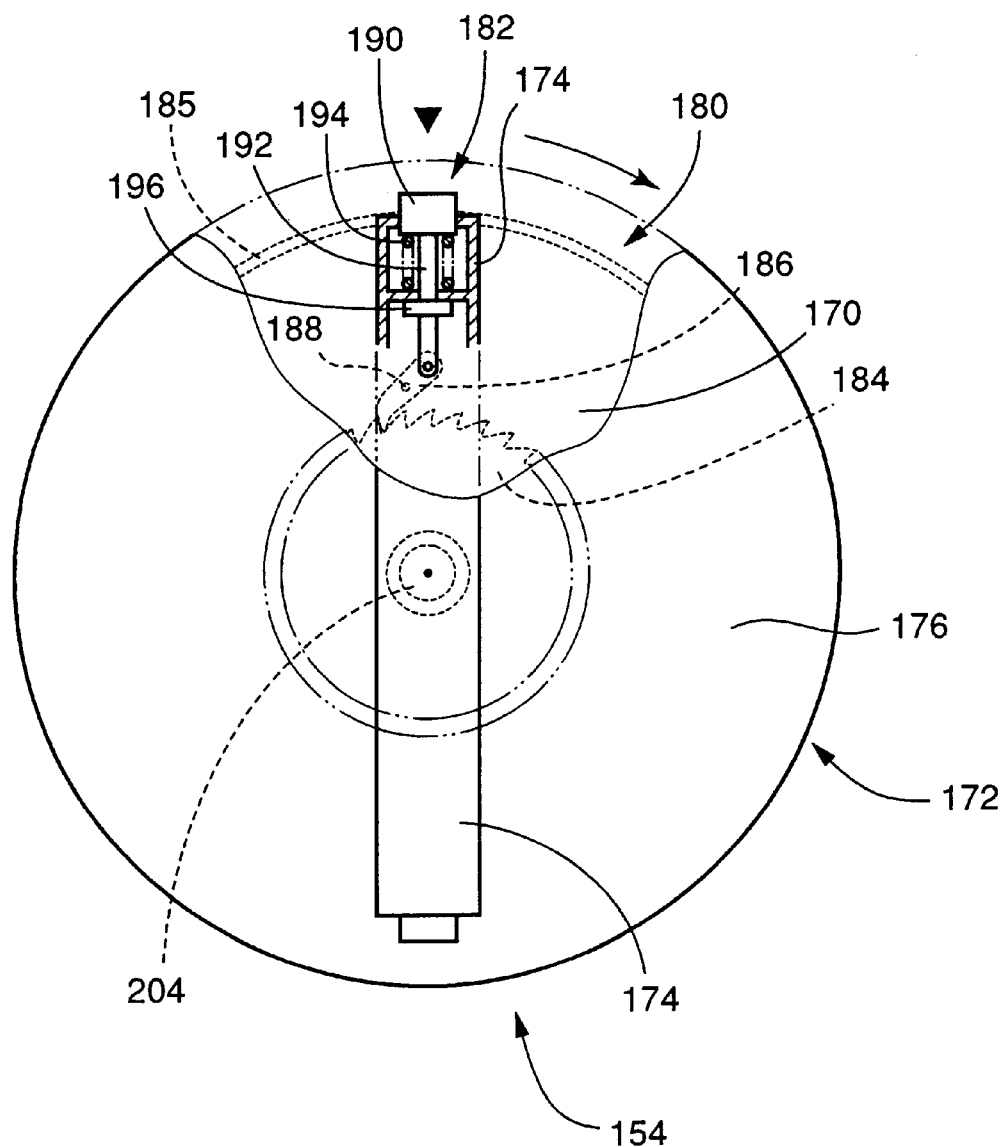
FIG. 6 is an enlarged side elevational view partly in cross section of a portion of the parking brake operating device.

The ratchet mechanism 180, which is well known in the art, will be briefly described by reference to the front elevational view of FIG. 6, which shows in cross section a part of the interior of the knob 174 of the parking brake operating device 154, with an upper portion of the circular disc 176 being cut away.

The ratchet mechanism 180 has a housing 185 fixed to the rear surface of the downwardly extending plate portion of the mounting bracket 170. Within this housing 185, there is fixed a ratchet wheel 184 in parallel with the downwardly extending plate portion of the mounting bracket 170. the ratchet wheel 184 has a plurality of saw teeth formed along its circumference. The housing 185 has a pivot shaft 188 fixed thereto in parallel with the axis of rotation of the operating member 172. A pawl 186 is supported by the pivot shaft 188 pivotally about the axis of the pivot shaft 188. The pawl 186 has an end portion which selectively engages one of the saw teeth of the ratchet wheel 184.

The reset pushbutton 182, which serves as a parking brake releasing member, has an operating portion 190 and a shaft portion 192 extending from the operating portion 190. The reset pushbutton 182 is almost entirely accommodated in the knob 174 of the operating member 172 such that the pushbutton 182 is movable parallel to the direction of extension of the knob 174. An upper end part of the operating portion 190 projects upwards from the upper end face of the knob 174. The reset pushbutton 182 is held in its non-operated position by a spring 194 and a stopper 196. The spring 194 biases the pushbutton 182 in the upward direction, and the non-operated position of the pushbutton 182 is determined by abutting contact of the stopper 196 with an inner wall of the knob 174. The shaft portion 192 of the reset pushbutton 182 is connected at its free end to the end portion of the pawl 186 which is opposite to the above-indicated end portion engaging the ratchet wheel 184. When the reset pushbutton 182 is placed in its non-operated or original position of FIG. 6, the pawl 186 is held in engagement with the ratchet wheel 184, preventing the operating member 172 from being rotated relative to the mounting bracket 170 in the clockwise direction (as seen in FIG. 6), namely, in the direction of releasing the parking brake. When the reset pushbutton 182 is pushed down into the knob 174, from the non-operated position, against the biasing force of the spring 194, the pawl 186 is pivoted about the pivot shaft 188 and is thereby disengaged from the ratchet wheel 184, so that the operating member 172 is permitted to be rotated in the clockwise direction. The operating member 172 can be rotated in the counterclockwise direction (in the direction of increasing the parking brake force) without depressing the reset pushbutton 182.

As shown in FIGS. 1 and 5, an angle sensor 198 is also attached to the back surface of the downwardly extending plate portion of the mounting bracket 170. The angle sensor 198 has a housing 200, and a rotor 202 rotatably supported by the housing 200, and generates an output signal indicative of the angular position of the rotor 202. The angle sensor 198 may be potentiometer, for example. The rotor 202 is rotated with the operating member 172 of the parking brake operating device 154. Described more specifically, a shaft 204 is coaxially fixed at one end thereof to the operating member 172 so that the shaft 204 is rotated with the operating member 172. The shaft 204 extends through the ratchet mechanism 180 and is fixed at the other end to the rotor 202 so that the rotor 202 is rotated with the shaft 204, namely, with the operating member 172.

The angle sensor 198 has a spring 206 disposed between the housing 200 and the rotor 202. The spring 206 biases the rotor 202 in a rotating direction toward an original or initial position of the rotor 202 which corresponds to the non-operated position of the operating member 172. This original position is determined by a stopper (not shown). The elastic or biasing force of the spring 206 is transmitted to the operating member 172 through the shaft 204, so that the spring 206 functions as the automatic return mechanism 183 for returning the operating member 172 to its non-operated position as described above.

While the mechanical arrangement of the braking system has been described above, an electrical arrangement of the braking system will be described referring to FIG. 1.

As indicated above, the braking system includes the electronic brake control unit (BRAKE CONTROL ECU) 220, which is constituted principally by a computer incorporating a central processing unit (CPU), a read-only memory (ROM) and a random-access memory (RAM). The electronic brake control unit 220 is adapted to control the ultrasonic motor 14 so as to control the pressing force of the brake pads 20a, 20b for thereby controlling the electrically operated disc brakes 16, when a normal or parking brake is applied to the vehicle. The braking system includes a first main battery 210 and a second main battery 212 both serving as a power source for the electronic brake control unit 220. The first main battery 210 is used for the disc brakes 16 for the front wheels FL, FR, while the second main battery 212 is used for the disc brakes 16 for the rear wheels RL, RR. Unless the first and second main batteries 210, 212 are both defective, the disc brakes 16 for at least one of the front and rear pairs of wheels are available under the control of the electronic brake control unit 220.

To the input side of the electronic brake control unit 220, there are connected the above-indicated load sensors 140 for the four wheels, the above-indicated parking brake releasing switch 156 and angle sensor 198. To the input side of the electronic brake control unit 220, there are also connected: an ignition switch 222 for starting the engine 10; a vehicle speed sensor 223 for detecting the running speed of the vehicle; four wheel speed sensors 225 for detecting the rotating speeds of the respective wheels FL, FR, RL, RR; an acceleration sensor 226 for detecting the longitudinal acceleration of the vehicle; a yaw rate sensor 228 for detecting a yaw rate of the vehicle; and a steering angle sensor 230 for detecting the steering angle of the vehicle (angular position of the steering wheel 164).

To the input side of the electronic brake control unit 220, there are also connected a brake pedal switch 234 and an operating stroke sensor 236. The brake pedal switch 234 is provided to detect an operation of the brake pedal 146, while the operating stroke sensor 236 is provided to detect an operating stroke of the brake pedal 146. The operating stroke sensor 236, which may be a potentiometer, for instance, generates an output signal in the form of a voltage which changes with the angle of operation of the brake pedal.

To the output side of the electronic brake control unit 220, there are connected a first driver 240 and a second driver 242. The first driver 240 is connected between a first auxiliary battery 244 and the ultrasonic motors 14 of the disc brakes 16 for the front wheels, while the second driver 242 is connected between a second auxiliary battery 246 and the ultrasonic motors 14 of the disc brakes 16 for the rear wheels. Upon application of a normal or parking brake to the vehicle, commands are fed from the electronic brake control unit 220 to the first and second drivers 240, 242, so that each ultrasonic motors 14 is energized with a controlled electric current supplied from the corresponding driver 240, 242.

To the output side of the electronic brake control unit 220, there are also connected engine output control devices for controlling the output of the engine 10, and a shift control device for controlling the automatic transmission 12. The engine output control devices includes a throttle valve control device, a fuel supply control device, and an ignition timing control device. The shift control device includes solenoid-operated valves for shifting the automatic transmission 12. During running of the vehicle, the electronic brake control unit 220 generates signals for controlling those engine output control devices and shift control device, so as to prevent spinning of each drive wheel. That is, the control unit 220 is adapted to execute a traction control routine for controlling the drive force of each drive wheel.

To the output side of the electronic brake control unit 220, there is also connected an electronic monitoring and failure-detecting unit 252 (abbreviated as "MONITORING ECU in FIG. 1), which is adapted to monitor electric and electronic components relating to the disc brakes 16, for detecting malfunction or failure of any of those components, and to activate a brake alarm indicator 250 for informing the vehicle operator of any malfunction or failure if detected.

Figure 7:
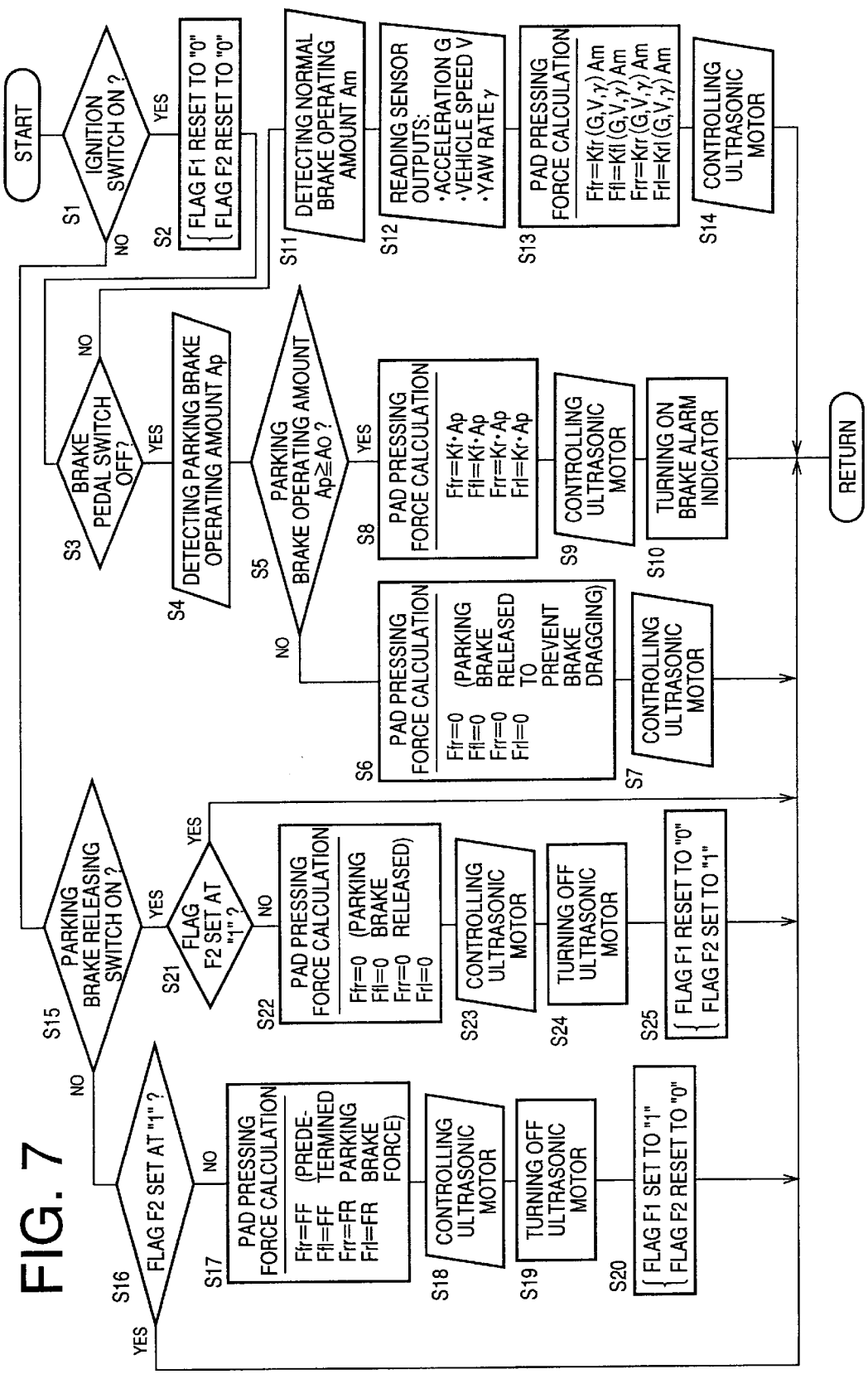
FIG. 7 is a flow chart illustrating a brake control routine executed according to a control program stored in a ROM of an electronic brake control unit used in the braking system of FIG. 1.

Referring next to FIG. 7, there is illustrated a brake control routine executed by the electronic brake control unit 220 according to a control program stored in the ROM of the computer.

The brake control routine will be briefly discussed first. The routine is executed, upon application of a normal or parking brake to the vehicle, to control the ultrasonic motors 14 of the electrically operated disc brakes 16. Upon application of the normal brake, an operating amount Am of the brake pedal 146 (hereinafter referred to as "normal brake operating amount Am") is detected on the basis of the output signal of the operating stroke sensor 236. Then, a target or desired value of the force (hereinafter referred to as "pad pressing force") by which the brake pads 20a, 20b are pressed by the ultrasonic motor 14 of each disc brake 16 is calculated on the basis of the detected normal brake operating amount Am, and detected values of other parameters indicative of the vehicle condition, such as the acceleration value, running speed and yaw rate of the vehicle. The ultrasonic motor 14 is controlled in a feedback manner such that the actual value of the pad pressing force detected by the load sensor 140 coincides with the calculated target value.

The present brake control routine is formulated such that the disc brakes 16 function as the parking brakes not only when the ignition switch 222 is in the ON state, but also when the ignition switch 222 is in the OFF state. That is, the parking brake operating device 154 may be operated when the ignition switch 222 is placed in either of the ON and OFF states.

When the ignition switch 222 is placed in the ON state, an operating amount Ap of the parking brake operating device 154 (hereinafter referred to as "parking brake operating amount Ap) is detected on the basis of the output signal of the angle sensor 198. On the basis of the detected parking brake operating amount Ap, the electronic brake control unit 220 determines whether the parking brake is applied with the parking brake operating device 154, or released with the operating member 172 placed in the non-operated position. When the parking brake is applied, the ultrasonic motors 14 are controlled to control the pad pressing force based on the detected parking brake operating amount Ap. When the parking brake is released, the ultrasonic motors 14 are controlled to return the brake pads 20a, 20b to their non-operated or fully retracted position at which no brake drag takes place with the brake pads 20a, 20b being spaced apart from the friction surfaces 18a, 18b of the disc rotor 17.

The vehicle operator may operate the parking brake operating device 154 to apply a parking brake to the vehicle while the ignition switch 222 is in the ON state. However, the parking brake operating device 154 may be in a position for applying a parking brake, without recognition of this fact, while the ignition switch 222 is in the ON state. In view of this latter case, the brake control routine is adapted to inform the vehicle operator, in that case, that the parking brake operating device 154 is in an operated position while the ignition switch 222 is in the ON state.

When the ignition switch 222 is in the OFF state and when the parking brake releasing switch 156 is in the non-operated state, the ultrasonic motors 14 are controlled such that the pad pressing force of each wheel disc brake 16 coincides with the value determined by the position of the operating member 172 of the parking brake operating device 154. When the parking brake releasing switch 156 is operated, the ultrasonic motors 14 are controlled to release the parking brake by the disc brakes 16.

The brake control routine will be described in detail by reference to the flow chart of FIG. 7. This routine is repeatedly executed for each of the four wheels, with a cycle time T. The following description refers to the execution of the brake control routine for one of the wheels.

Each cycle of execution of the brake control routine is initiated with step S1 to determine whether the ignition switch 222 is in the ON state, that is, whether the vehicle operator is ready to start the vehicle. If an affirmative decision (YES) is obtained in step S1, the control flow goes to step S2 to reset both of a flag F1 and a flag F2 to "0". These flags F1 and F2 are provided in the RAM. The functions of the flags F1, F2 will be described. Then, step S3 is implemented to determine whether the brake pedal switch 234 is in the OFF state, that is, whether a normal brake is released. If an affirmative decision (YES) is obtained in step S3, the control flow goes to step S4 to detect the parking brake operating amount Ap, that is, the operating amount Ap of the parking brake operating device 154 (operating member 172), on the basis of the output of the angle sensor 198, which represents the angular position of the operating member 172. Step S4 is followed by step S5 to determine whether the detected parking brake operating amount Ap is equal to or larger than a reference value Ao which is slightly larger than zero. An affirmative decision (YES) in this step S5 means that a substantial parking brake is applied to the vehicle. If the reference value Ao were zero, only a very small amount of the detected parking brake operating amount Ap results in a determination that the parking brake operating device 154 is in an operated position, while the vehicle operator does not have an intention to apply a parking brake to the vehicle. To avoid this undesirable determination, the reference value Ao is set to be larger than zero by a suitable amount corresponding to an expected inevitable detecting error of the angle sensor 198 or an expected variation in the non-operated position of the operating member 172.

If a negative decision (NO) is obtained in step S5, the control flow goes to step S6 in which a target value of a pad pressing force Ffr, Ffl, Frr, Frl for the corresponding wheel is calculated so as to place the disc brake 16 in the non-operated position while preventing brake dragging. Described more specifically, the target value of the pad pressing force Ffr, Ffl, Frr, Frl is zeroed. Step S6 is followed by step S7 in which the ultrasonic motor 14 is controlled so that the actual value of the pad pressing force coincides with the calculated target value. Thus, one cycle of execution of the routine is terminated.

If the parking brake operating amount Am is equal to or larger than the reference value Ao, that is, if an affirmative decision (YES) is obtained in step S5, the control flow goes to step S8 in which the target value of the pad pressing force Ffr, Ffl, Frr, Frl of the corresponding wheel is calculated on the basis of the detected parking brake operating amount Ap. Described more specifically, the target value of the pad pressing force Ffr for the front right wheel FR is calculated as follows:

$$Ffr=Kf \cdot Ap$$

The target value of the pad pressing force Ffl for the front left wheel FL is calculated as follows:

$$Ffl=Kf \cdot Ap$$

The target value of the pad pressing force Frr for the rear right wheel RR is calculated as follows:

$$Frr=Kr \cdot Ap$$

The target value of the pad pressing force Frl for the rear left wheel RL is calculated as follows:

$$Frl=Kr \cdot Ap$$

In the above equations, "Kf" represents a coefficient for the front wheels FR, FL, while "Kr" represents a coefficient for the rear wheels RR, RL.

Then, the control flow goes to step S9 to control the ultrasonic motor 14 so that the actual value of the pad pressing force coincides with the calculated target value. Step S9 is followed by step S10 to activate the brake alarm indicator 250 to inform the vehicle operator that the parking brake operating device 154 is placed in an operated position with the ignition switch 222 in the ON state. The activation of the brake alarm indicator 250 enables the vehicle operator to turn off the parking brake operating device 154, if the vehicle operator does not have an intention to apply a parking brake. Thus, one cycle of execution of the routine is terminated.

Where the brake alarm indicator 250 includes both an alarm light and an alarm buzzer, it is possible that both of the alarm light and buzzer are activated during running of the vehicle, and only the alarm light is activated while the vehicle is in a stop. In this respect, it is noted that the activation of the buzzer attracts more attention of the vehicle operator than that of the light, and that an unintended operation of the parking brake operating device 154 is more probable while the vehicle is running than while the vehicle is in a stop. Accordingly, it is better to activate both of the alarm light and buzzer during running of the vehicle, and only the alarm light during stopping or parking of the vehicle, if the parking brake operating device 154 is in an operated position while the ignition switch is in the ON state.

While the brake control routine executed when the ignition switch 222 is in the ON state and when the brake pedal switch 234 is in the OFF state has been described, there will be described the brake control routine executed when the ignition switch 222 and the brake pedal switch 234 are both placed in the ON state.

In this case, the affirmative decision (YES) is obtained in step S1 while a negative decision (NO) is obtained in step S3, and the control flow goes to step S1 to detect the normal brake operating amount Am, that is, the operating amount Am of the brake pedal 234, on the basis of the output signal of the operating stroke sensor 236, which represents the operating stroke of the brake pedal 234. Then, the control flow goes to step S12 to read the output signals of the various sensors, more specifically, to detect the vehicle acceleration value G on the basis of the output signal of the acceleration sensor 226, detect the vehicle running speed V on the basis of the output signal of the vehicle speed sensor 224, and detect the yaw rate γ of the vehicle on the basis of the output signal of the yaw rate sensor 228. Step S12 is followed by step S13 in which the target value of the pad pressing force Ffr, Ffl, Frr, Frl of the wheel in question is calculated on the basis of the detected normal brake operating amount Am, and the detected acceleration value G, running speed V and yaw rate γ of the vehicle, so as to reflect the intention of the vehicle operator and so as to stabilize the running behavior of the vehicle. More particularly, the target value of the pad pressing force Ffr of the front right wheel FR is calculated as follows:

$$Ffr=Kfr(G, V, \gamma)\cdot Am$$

The target value of the pad pressing force Ffl of the front left wheel FL is calculated as follows:

$$Ffl=Kfl(G, V, \gamma)\cdot Am$$

The target value of the pad pressing force Frr of the rear right wheel RR is calculated as follows:

$$Frr=Krr(G, V, \gamma)\cdot Am$$

The target value of the pad pressing force Frl of the rear left wheel RL is calculated as follows:

$$Frl=Krl(G, V, \gamma)\cdot Am$$

In the above equations, the values Kfr(G, V, γ), Kfl(G, V, γ), Krr(G, V, γ) and Krl(G, V, γ) represent respective coefficients of the four wheels FR, FL, RR, RL. These coefficients change as a function of the vehicle acceleration value G, running speed V and yaw rate γ.

Step S13 is followed by step S14 to control the ultrasonic motor 14 of the disc brake 16 for the wheel in question, so that the actual value of the pad pressing force coincides with the calculated target value.

While the brake control routine when the ignition switch 222 is in the ON state, the brake control routine when the ignition switch 222 is in the OFF state.

In this case, a negative decision (NO) is obtained in step S1, and the control flow goes to step S15 to determine whether the parking brake releasing switch 156 is in the ON state. If a negative decision (NO) is obtained in step S15, the control flow goes to step S16 to determine whether the flag F1 is set at "1". If a negative decision (NO) is obtained in step S16, the control flow goes to step S17 to calculate the target value of the pad pressing force Ffr, Ffl, Frr, Frl of the wheel in question, to hold the vehicle stationary. Described in detail, if the wheel in question is one of the front right and left wheels FR, FL, the target value of the pad pressing force Ffr, Ffl is determined to be a predetermined constant value FF. If the wheel in question is one of the rear right and left wheels RR, RL, the target value of the pad pressing force Frr, Frl is determined to a predetermined constant value RR. Step S17 is followed by step S18 to control the ultrasonic motor 14 of the disc brake 16 for the wheel in question, so that the actual value of the pad pressing force coincides with the determined target value FF, RR. Then, the control flow goes to step S19 to turn off the ultrasonic motor 14, that is, to cut a supply of electric power to the ultrasonic motor 14, so that the ultrasonic motor 14 produces a holding torque and cooperates with the ballscrew mechanism 74 to mechanically maintain the operating force of the disc brake 16, namely, to hold the parking brake force, for thereby holding the vehicle stationary. Then, step S20 is implemented to set the flag F1 to "1" and reset the flag F2 to "0". Thus, one cycle of execution of the brake control routine is terminated.

If the parking brake releasing switch 156 is still placed in the OFF state in the next cycle of execution of the present routine wherein the flag F1 is set at "1", an affirmative decision (YES) is obtained in step S16, and steps S17–S20 are skipped, so that the ultrasonic motor 14 is kept in the OFF state. Thus, the consumption of the electric energy is saved.

If the parking brake releasing switch 156 is turned ON, an affirmative decision (YES) is obtained in step S15, and the control flow goes to step S21 to determine whether the flag F2 is set at "1". Since the flag F2 has been reset to "0" in step S20, a negative decision (NO) is obtained in step S21, and the control flow goes to step S22 to calculate the target value of the pad pressing force Ffr, Ffl, Frr, Frl of the wheel in question, so as to release the parking brake, that is, so as to place the disc brake 16 in the non-operated position. More specifically, the target value of the pad pressing force Ffr, Ffl, Frr, Frl is zeroed. Then, step S23 is implemented to control the ultrasonic motor 14 so that the actual value of the pad pressing force coincides with the calculated target value, namely, is zeroed. Step S23 is followed by step S24 in which the ultrasonic motor 14 is turned OFF or brought to the non-operated position by cutting a supply of the electric power thereto. Then, the control flow goes to step S25 to reset the flag F1 to "0" and set the flag F2 to "1". Thus, one cycle of execution of the routine is terminated.

If the ignition switch 222 and the parking brake releasing switch 156 are still placed in the ON state in the next cycle of execution of the routine wherein the flag F2 is set at "1", an affirmative decision (YES) is obtained in step S21, and steps S22–S25 are skipped, so that the ultrasonic motor 14 is held in the OFF state. Thus, the consumption of the electric energy is saved.

It will be understood from the foregoing description of the present first embodiment that the engine 10 provides a drive power source, and the ignition switch 222 functions as a drive power source switch for detecting an operating state of the drive power source. It will also be understood that the disc brake 16 constitutes a parking brake, while the ultrasonic motor 14 constitutes an electric motor. The ultrasonic motor 14 which generates the holding torque and the ballscrew mechanism 74 cooperate to provide a force holding mechanism for mechanically maintaining the operating force of the disc brake 16 while the electric motor 14 is in the OFF state with no electric power supplied thereto. The parking brake operating device 154, the parking brake releasing switch 156 and a portion of the electronic brake control unit 220 assigned to implement steps S1 and S15–S25 cooperate with each other to constitute a parking brake control device. The parking brake releasing switch 156 and a portion of the electronic brake control unit 220 assigned to implement steps S1, S15 and S21–S24 cooperate with each other to constitute an operating force changing device, and first motor control means. The actual operating force changing device is adapted to change the actual value of the operating force of the disc brake 16. The parking brake releasing switch 156 serves as a switch for releasing the parking brake.

Referring next to the flow chart of FIG. 8, there will be described a second embodiment of this invention, in which the same reference numerals as used in the first embodiment will be used to identify the corresponding or similar elements.

Figure 8:
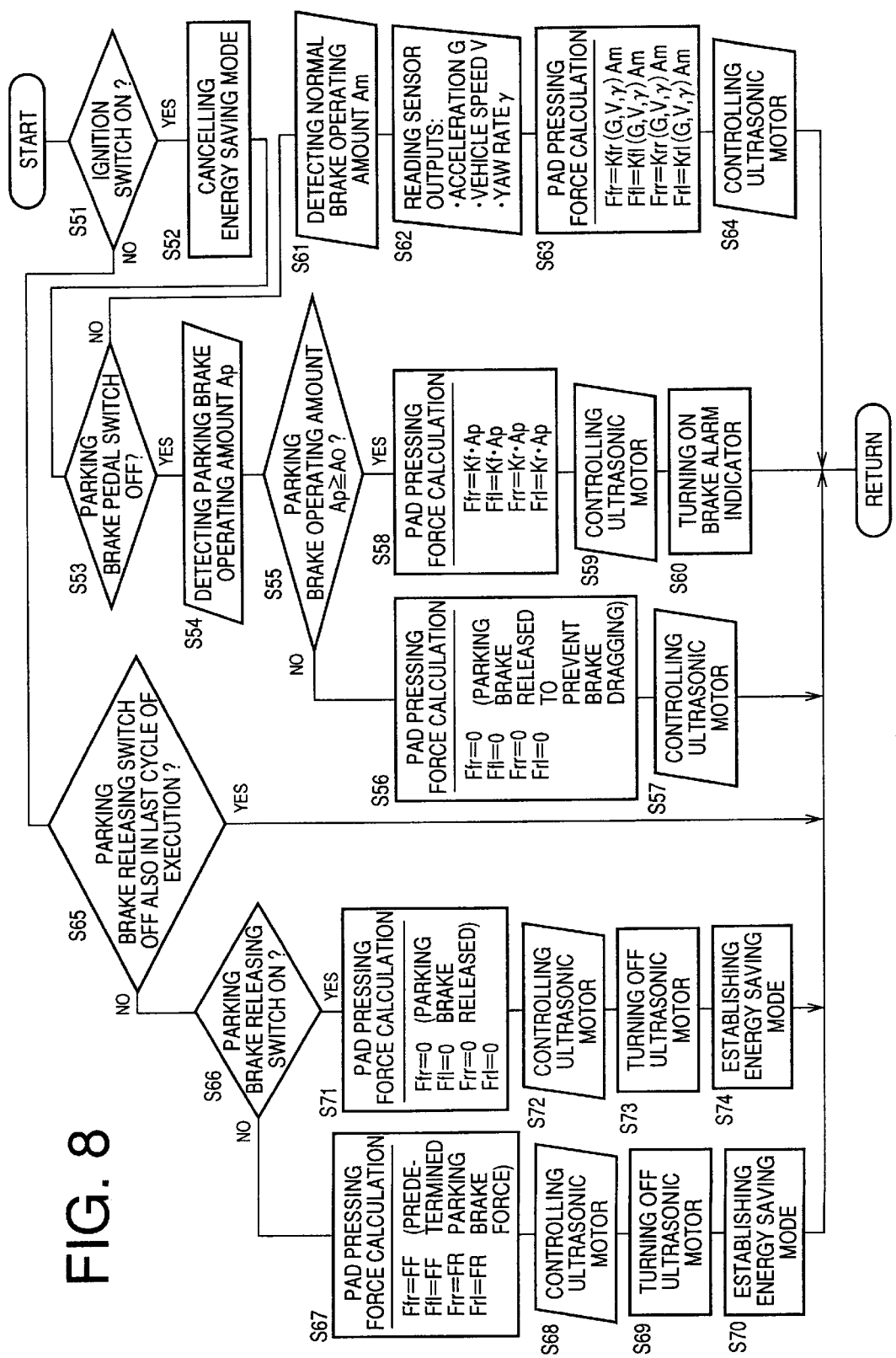
FIG. 8 is a flow chart illustrating a brake control routine executed according to a control program stored in a ROM of an electronic brake control unit used in a braking system including an electrically operated parking brake apparatus according to a second embodiment of the invention.

The brake control routine illustrated in the flow chart of FIG. 8 according to the second embodiment is similar in the basic design concept to that of the first embodiment. There will be briefly described a difference of the brake control routine of the second embodiment from that of the first embodiment.

The brake control routine according to the first embodiment is adapted to necessarily place the electrically operated disc brake 16 (serving as the parking brake) in the non-operated position, when the parking brake releasing switch 156 is turned ON while the ignition switch 22 is OFF. If the switch 156 is turned OFF, the disc brake 16 is operated to apply a parking brake to the vehicle. On the other hand, the brake control routine according to the present second embodiment is adapted to place the disc brake 16 in the non-operated position, only where the parking brake releasing switch 156 is turned ON when or immediately after the ignition switch 222 is turned OFF, that is, turned from the ON state to the OFF state. If the operation of the parking brake releasing switch 156 is detected in the present control cycle following the control cycle in which the ignition switch 222 is turned OFF, the disc brake 16 is not brought to the non-operated state. This arrangement is effective to prevent releasing of the parking brake by the disc brake 16 due to erroneous or unintended operation of the parking brake releasing switch 156 while the ignition switch 222 is in the OFF state.

The brake control routine according to the second embodiment is also adapted to reduce the consumption of the electric energy by the electronic brake control unit 220, as compared with that in the first embodiment. In the brake control routine in the first embodiment, steps S15–S20 or steps S15 and S21–S25 are implement depending upon whether the parking brake releasing switch 156 is in the ON state or not, while the ignition switch 222 is held in the OFF state. In the brake control routine of the present second embodiment, steps S66–S69 (corresponding to steps S15 and S17–S19) or steps S66 and S71–S74 (corresponding to steps S15 and S22–S24) are not implemented if the ignition switch 222 is held in the OFF state, that is, is placed in the OFF state in the last and present cycles of execution of the routine, namely, if an affirmative decision (YES) is obtained in step S65. In other words, only steps S51 and S65 are implemented if the ignition switch 222 is held OFF. This arrangement is effective to reduce the required amount of consumption of the electric energy by the electronic brake control unit 220 in the second embodiment, as compared with that in the first embodiment. An operation mode of the electronic brake control unit 220 in which only steps S51 and S65 are implemented will be referred to as an energy saving mode.

Since the brake control routine of FIG. 8 of the second embodiment include many steps similar to those of the brake control routine of FIG. 7 of the first embodiment, only the steps of FIG. 8 characteristic of the second embodiment will be described.

Like the routine of the first embodiment, the routine of FIG. 8 is repeatedly executed with a very short cycle time (e.g., 5–10 ms). Each cycle of execution of the routine is initiated with step S51 to determine whether the ignition switch 222 is in the ON state. If an affirmative decision (YES) is obtained in step S51, the control flow goes to step S52 to cancel the energy saving mode. Then, steps S53–S64 similar to steps S3–S14 of the routine of FIG. 7 are implemented.

If the ignition switch 222 is in the OFF state, a negative decision (NO) is obtained in step S51, and the control flow goes to step S65 to determine whether the ignition switch 222 was placed in the OFF state also in the last cycle of execution of the routine. If the ignition switch 222 was placed in the ON state in the last cycle of execution, that is, if a negative decision (NO) is obtained in step S65, the control flow goes to step S66 to determine whether the parking brake releasing switch 156 is in the ON state. If a negative decision (NO) is obtained in step S66, the control flow goes to steps S67–S69 similar to steps S17–S19 of FIG. 7, whereby the disc brake 16 is operated as the parking brake to hold the vehicle stationary. Then, step S70 is implemented to establish the energy saving mode. Thus, one cycle of execution of the routine is terminated.

If the parking brake releasing switch 156 is turned ON at substantially the same time when or immediately after the ignition switch 222 is turned OFF, that is, if the ignition switch 222 was in the OFF state in the last cycle of execution and is in the OFF state in the present cycle, and if the parking brake releasing switch 156 is in the ON state, the negative decision (NO) is obtained in step S51 and also in step S65, the control flow goes to steps S71–S73 similar to steps S22–S24 of FIG. 7, whereby the disc brake 16 is brought to the non-operated position to release the parking brake, so that the vehicle can be started. Step S73 is followed by step S74 to establish the energy saving mode. Thus, one cycle of execution of the routine is terminated.

If the ignition switch 222 was in the OFF state in the last cycle of execution of the routine, an affirmative decision (YES) is obtained in step S65, and one cycle of execution of the routine is terminated. Thereafter, only the steps S51 and S65 are repeatedly implemented, so that the amount of energy consumption by the electronic brake control unit 222 is saved.

Once the disc brake 16 is brought to the non-operated position as a result of operation of the parking brake releasing switch 156 when the ignition switch 222 is turned OFF, the disc brake 16 cannot be operated to apply a parking brake to the vehicle until the ignition switch 222 is turned ON again. A mechanically operated emergency brake in the form of a drum brake, for example, may be provided, to apply a parking brake to the vehicle even in such an event, by operation of a suitable brake operating member such as an emergency brake pedal or lever.

It will be understood from the above description of the second embodiment that the parking brake operating device 154, the parking brake releasing switch 156 and a portion of the electronic brake control unit 220 assigned to implement steps S51 and S65–S74 cooperate with each other to constitute a parking brake control device. The parking brake releasing switch 156 and a portion of the electronic brake control unit 220 assigned to implement steps S51, S66 and S71–S74 cooperate with each other to constitute the operating force changing device, and first motor control means. The parking brake releasing switch 156 serves as a switch for releasing the parking brake.

Figure 9:
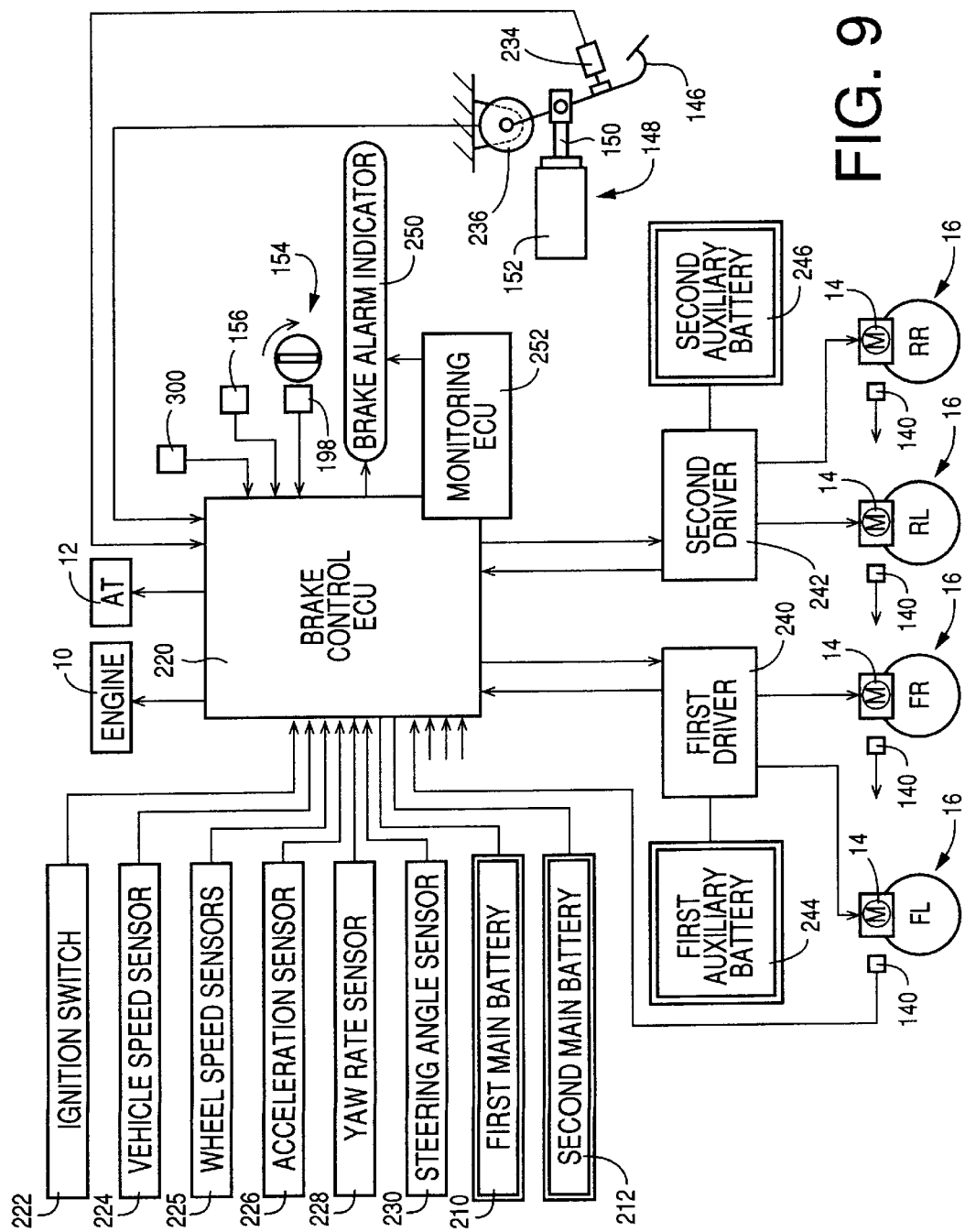
FIG. 9 is a schematic view of a braking system including an electrically operated parking brake apparatus according to a third embodiment of this invention.
Figure 10:
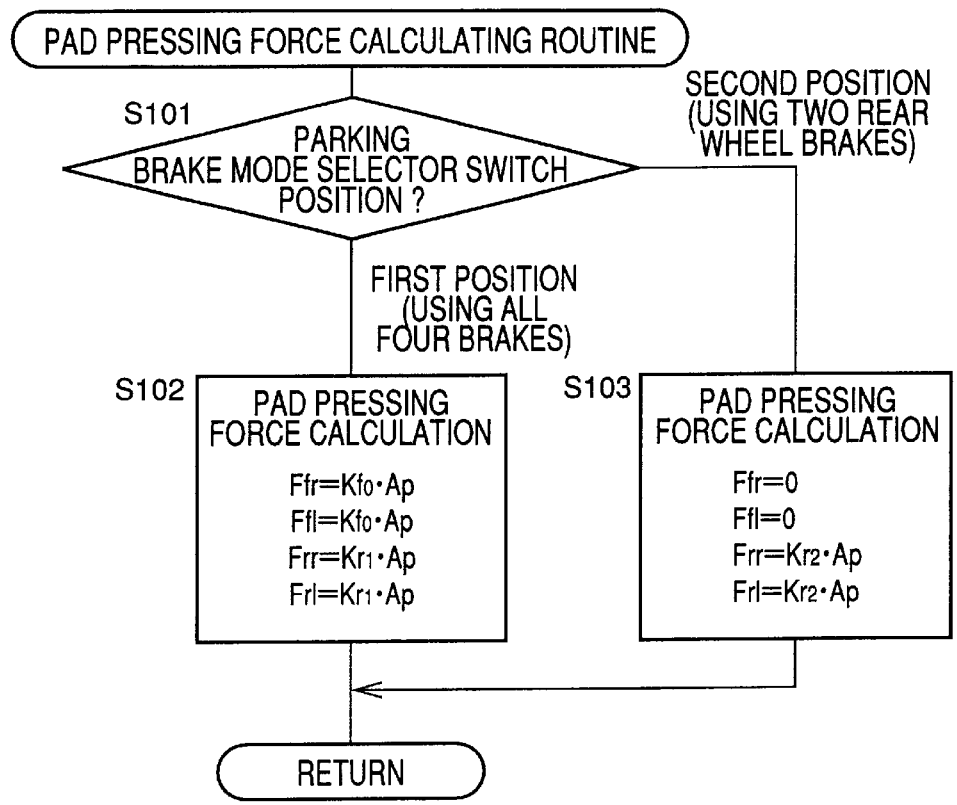
FIG. 10 is a flow chart illustrating a pad pressing force calculating routine executed in one step of a brake control routine executed according to a control program stored in a ROM of an electronic brake control unit used in the braking system of FIG. 9.

Referring to FIGS. 9 and 10, a third embodiment of this invention will be described. This third embodiment is similar to the first embodiment in many aspects, and is different therefrom in respect of only the brake control routine and the electrical arrangement. Only the elements characteristic of the third embodiment will be described, with the same reference signs as used in the first embodiment being used to identify the corresponding or similar elements.

The first embodiment is adapted to operate the disc brakes 16 for all of the four wheels as the parking brakes when the parking brake operating device 154 is operated while the ignition switch 222 is in the ON state. The present third embodiment is adapted select one of two parking brake modes. In the first parking brake mode, the disc brakes 16 for the four wheels are all operated as the parking brakes. In the second parking brake mode, only the disc brakes 16 for the rear wheels are operated as the parking brakes. To select the parking brake mode, the braking system includes a parking brake mode selector switch 300, as shown in FIG. 9. The selector switch 300 has a first position for selecting the first parking brake mode using the four disc brakes 16 as the parking brakes, and a second position for selecting the second parking brake mode using the two disc brakes 16 for the rear wheels as the parking brakes.

The brake control routine in the third embodiment is identical with that of FIG. 7, except for the calculation of the target value of the pad pressing force in step S8. In the third embodiment, the target value of the pad pressing force of each wheel is calculated according to a pad pressing force calculating routine as illustrated in the flow chart of FIG. 10. This pad pressing force calculating routine is initiated with step S101 to determine whether the parking brake mode selector switch 300 is placed in the first position or in the second position. If the selector switch 300 is placed in the first position, the control flow goes to step S102 in which the target values of the pad pressing forces Ffr, Ffl, Frr, Frl for the four wheels are calculated, so that the four disc brakes 16 are all operated as the parking brakes. The target values of the pad pressure forces Ffr, Ffl, Frr, Frl are calculated as follows:

$$Ffr=Kfo \cdot Ap$$

$$Ffl=Kfo \cdot Ap$$

$$Frr=Krl \cdot Ap$$

$$Frl=Krl \cdot Ap$$

In the above equations, "Kfo" represents a coefficient for the front wheels, while "Krl" represents a coefficient for the rear wheels.

If the selector switch 300 is placed in the second position, the control flow goes to step S103 in which the target values of the pad pressing forces Ffr, Ffl, Frr, Frl are calculated, so that only the disc brakes for the two rear wheels are operated as the parking brakes. Described more specifically, the target values of the pad pressing forces Ffr, Ffl for the front right and left wheels FR, FL are zeroed, while the target values of the pad pressing forces Frr, Frl for the rear right and left wheels RR, RL are calculated as follows:

$$Frr=Kr2 \cdot Ap$$

$$Frl=Kr2 \cdot Ap$$

In the above equations, "Kr2" represents a coefficient for the rear wheels.

It will be understood from the above explanation of this third embodiment that the parking brake mode selector switch 300 and a portion of the electronic brake control unit 220 assigned to implement steps S101–S103 cooperate to constitute a parking brake mode selecting device for selecting one of a plurality of parking brake modes which use respective different combinations of the disc brakes 16 as parking brakes.

Figure 11:
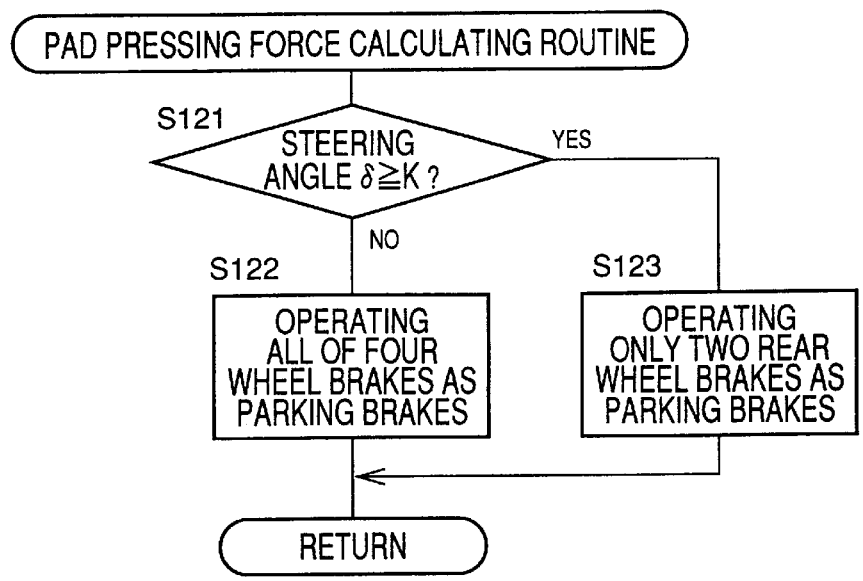
FIG. 11 is a flow chart illustrating one modification of the pad pressing force calculating routine of FIG. 10.
Figure 12:
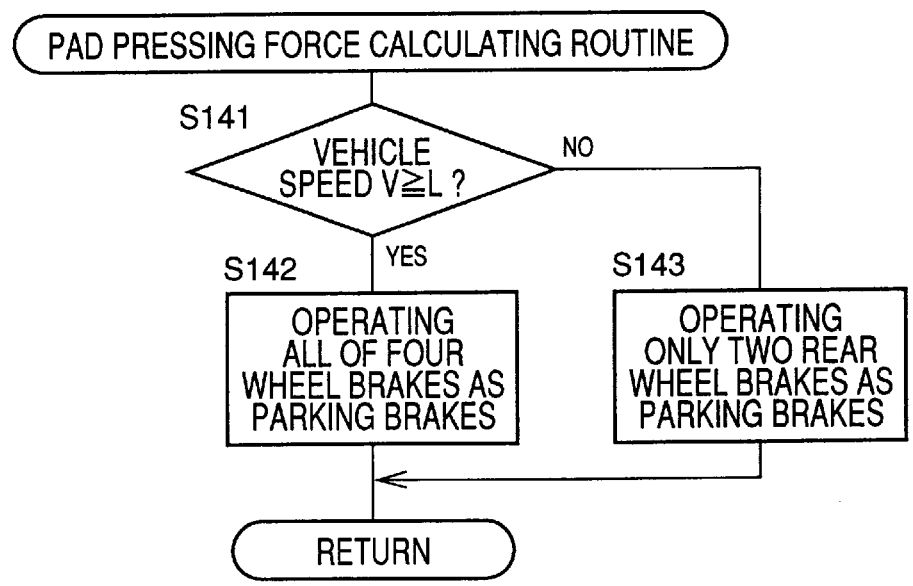
FIG. 12 is a flow chart illustrating another modification of the pad pressing force calculating routine.
Figure 13:
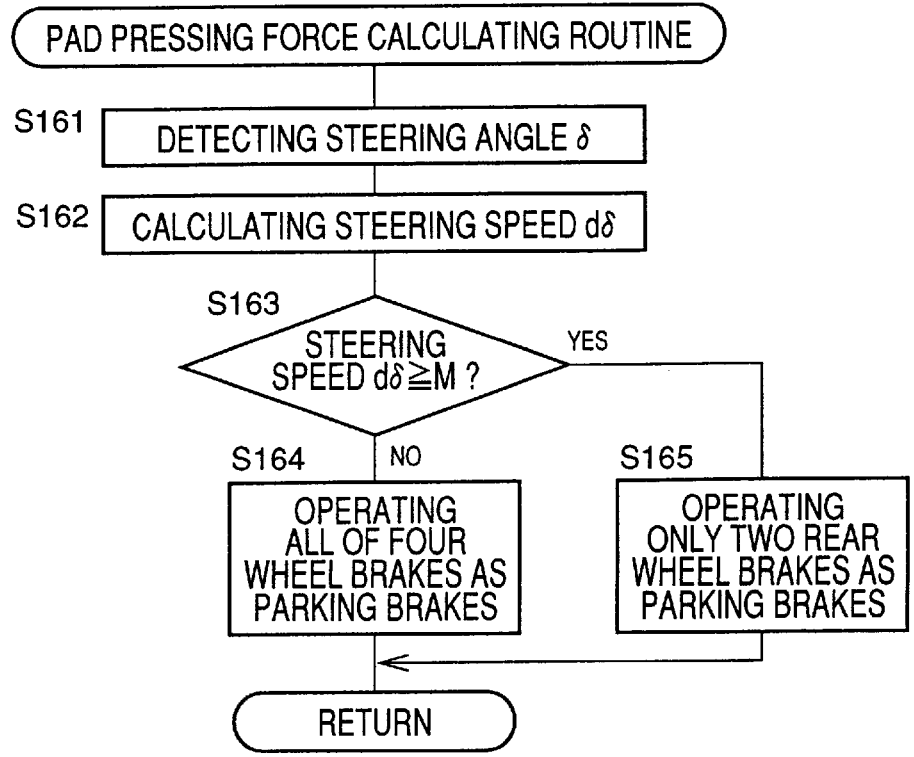
FIG. 13 is a flow chart illustrating a further modification of the pad pressing force calculating routine.

Referring to FIGS. 11–13, there are illustrated modifications of the pad pressing force calculating routine of FIG. 10. In the third embodiment of FIGS. 9 and 10, the manually operated parking brake mode selector switch 300 is provided to select either the first parking brake mode for using the four disc brakes 16 as the parking brakes, or the second parking brake mode for using only the two rear wheel disc brakes as the parking brakes. In the modified embodiments of FIGS. 11–13, one of these first and second parking brake modes is automatically selected. These three modified embodiments are arranged to select the second parking brake mode, when the parking brake operating device 154 is operated with the ignition switch 222 being in the ON state and when one of predetermined vehicle running conditions indicative of a vehicle operator's intention of purposely spinning the vehicle is detected. This arrangement is based on a relatively high possibility that if the vehicle operator operates the parking brake operating device 154 with the ignition switch 222 in the OFF state, the vehicle operator intends to purposely spin the vehicle by operating only the rear wheel disc brakes 16 as the parking brakes so as to cause slipping of the rear wheels in the lateral direction of the vehicle. A steering angle δ of the steering wheel equal to or larger than a predetermined threshold may be a typical example of the above-indicated predetermined vehicle running conditions indicative of the vehicle operator's intention of purposely spinning the vehicle.

Described in detail, the pad pressing force calculating routine illustrated in the flow chart of FIG. 11 is initiated with step S121 to determine whether the steering angle δ detected by the steering angle sensor 230 is equal to or larger than a predetermined threshold K. If a negative decision (NO) is obtained in step S121, the control flow goes to step S122 to calculate the target values of the pad pressing forces Ffr, Ffl, Frr, Frl of the four wheels, as in step S102 of FIG. 10, so that the disc brakes 16 of the four wheels are operated as the parking brakes. If an affirmative decision (YES) is obtained in step S121, the control flow goes to step S123 to calculate the target values of the pad pressing forces Ffr, Ffl, Frr, Frl, as in step S103 of FIG. 10, so that only the disc brakes 16 of the rear wheels are operated as the parking brakes.

It will be understood from the above explanation of the modified arrangement of FIG. 11 that the steering angle sensor 230 and a portion of the electronic brake control unit 220 assigned to implement steps S121–S123 of FIG. 11 cooperate to constitute the parking brake mode selecting device.

The pad pressing force calculating routine illustrated in the flow chart of FIG. 12 is initiated with step S141 to determine whether the vehicle running speed V detected by the vehicle speed sensor 224 is equal to or higher than a predetermined threshold L. If a negative decision (NO) is obtained in step S141, the control flow goes to step S142 to calculate the target values of the pad pressing forces Ffr, Ffl, Frr, Frl of the four wheels, as in step S102 of FIG. 10, so that the disc brakes 16 of the four wheels are operated as the parking brakes. If an affirmative decision (YES) is obtained in step S141, the control flow goes to step S143 to calculate the target values of the pad pressing forces Ffr, Ffl, Frr, Frl, as in step S103 of FIG. 10, so that only the disc brakes 16 of the rear wheels are operated as t he parking brakes.

It will be understood from the above explanation of the modified arrangement of FIG. 12 that the vehicle speed sensor 224 and a portion of the electronic brake control unit 220 assigned to implement steps S141–S143 of FIG. 12 cooperate to constitute the parking brake mode selecting device.

The pad pressing force calculating routine illustrated in the flow chart of FIG. 13 is initiated with step S161 to detect the steering angle δ on the basis of the output signal of the steering angle sensor 230. Step S162 is followed by step S162 to calculate a steering speed dδ (speed at which the steering wheel is rotated) by subtracting the steering angle δ detected in the last cycle of execution of the routine from the steering angle δ detected in the present cycle of execution, and by dividing the obtained difference by the cycle time of the present routine. Then, the control flow goes to step S163 to determine whether the steering speed dδ is equal to or higher than a predetermined threshold M. If a negative decision (NO) is obtained in step S163, the control flow goes to step S164 to calculate the target values of the pad pressing forces Ffr, Ffl, Frr, Frl of the four wheels, as in step S102 of FIG. 10, so that the disc brakes 16 of the four wheels are operated as the parking brakes. If an affirmative decision (YES) is obtained in step S163, the control flow goes to step S165 to calculate the target values of the pad pressing forces Ffr, Ffl, Frr, Frl, as in step S103 of FIG. 10, so that only the disc brakes 16 of the rear wheels are operated as the parking brakes.

It will be understood from the above explanation of the modified arrangement of FIG. 13 that the steering angle sensor 223 and a portion of the electronic brake control unit 220 assigned to implement steps S161–S165 of FIG. 12 cooperate to constitute the parking brake mode selecting device.

Any one of the pad pressing force calculating routines of FIGS. 10–13 may be substituted for step S58 of the second embodiment of FIG. 8, as well as step S8 of the first embodiment.

Figure 14:
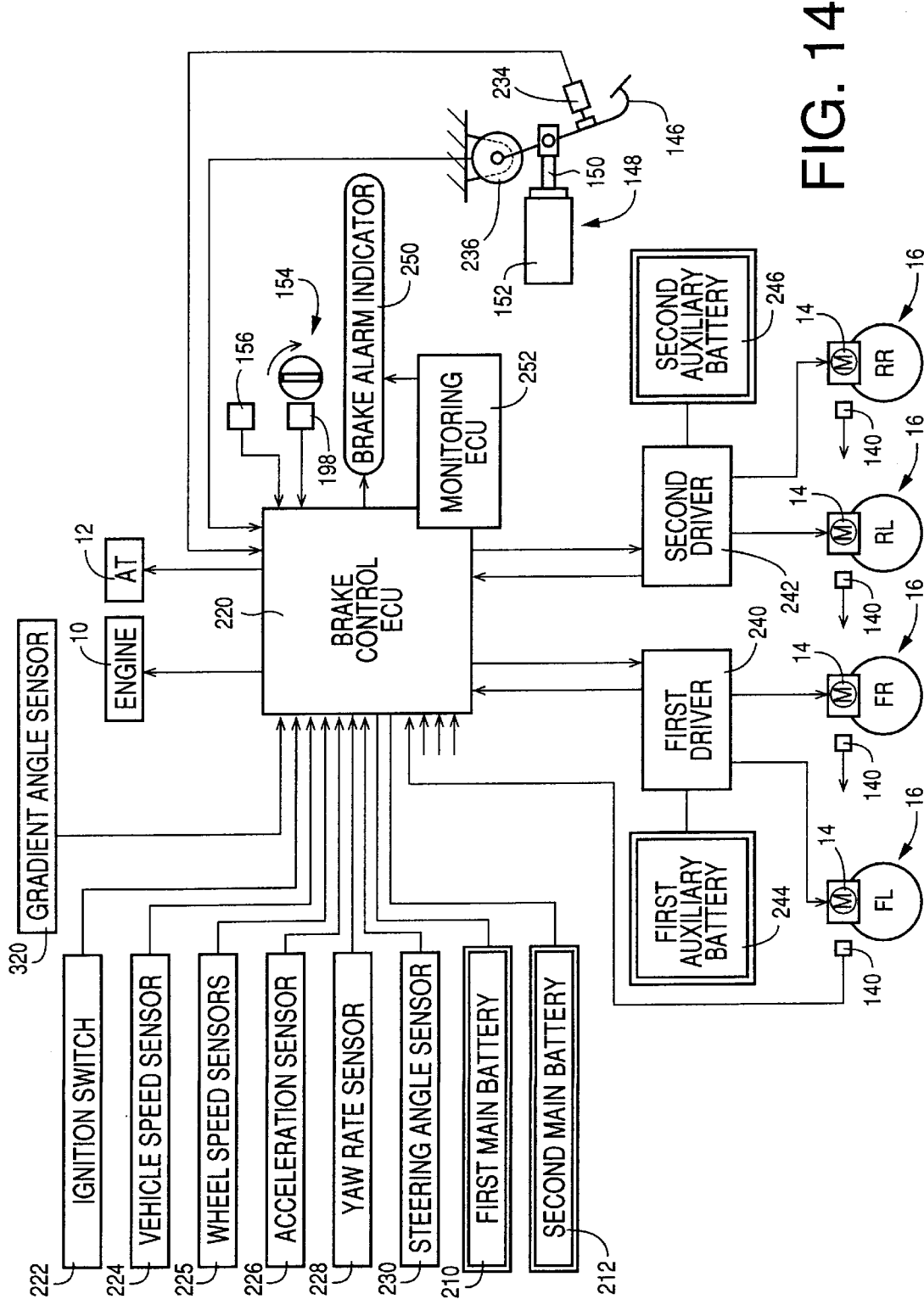
FIG. 14 is a schematic view showing a braking system including an electrically operated parking brake apparatus according to a fourth embodiment of this invention.
Figure 15:
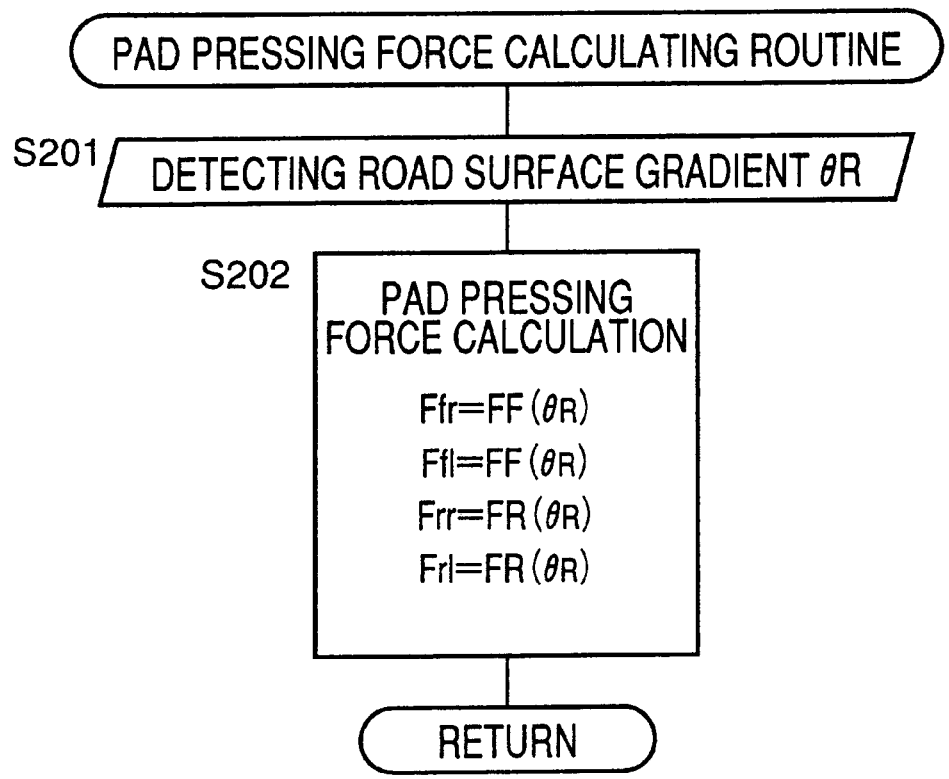
FIG. 15 is a flow chart illustrating a pad pressing force calculating routine executed in one step of a brake control routine executed according to a control program stored in a ROM of an electronic brake control unit used in the braking system of FIG. 14.
Figure 16:
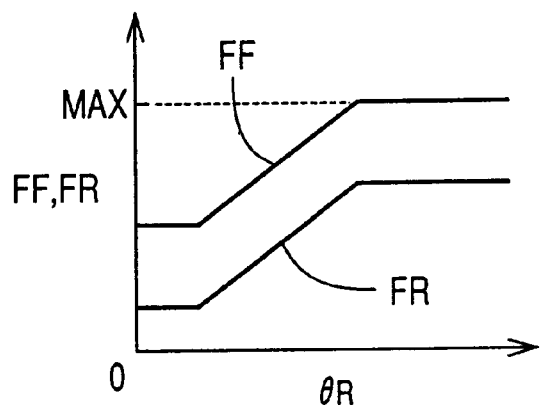
FIG. 16 is a graph for explaining the pad pressing force calculating routine of FIG. 15.

Referring to FIGS. 14–16, a fourth embodiment of this invention will be described. This fourth embodiment is similar to the first embodiment in many aspects, and is different therefrom in respect of only the brake control routine and the electrical arrangement. Only the elements characteristic of the fourth embodiment will be described, with the same reference signs as used in the first embodiment being used to identify the corresponding or similar elements.

The first embodiment is adapted to operate the disc brakes 16 of the four wheels as the parking brakes when the ignition switch 222 is turned from the ON state to the OFF state. While the first embodiment is arranged to control the ultrasonic motors 14 for holding the pad pressing forces at the predetermined values FF, FR, in step S17 of FIG. 7, the present fourth embodiment is arranged such that the pad pressing forces vary with a change in a gradient angle θR of a road surface on which the vehicle is parked. Described more specifically, the pad pressing force FF for the front right and left wheels is determined to be larger than the pad pressing force FR for the rear right and left wheels, and these pad pressing forces FF, FR change with the road surface gradient θR, as indicated in the graph of FIG. 16. To this end, the braking system of the fourth embodiment has a gradient sensor 320, as shown in FIG. 14. For example, the gradient sensor 320 may be of a weight type including a weight supported by the vehicle body such that the centerline of the weight is pivotable relative to a reference axis fixed on the vehicle body such that the axis extends in the vertical direction where the road surface gradient is zero. The angle formed between the centerline of the weight and the reference axis in a plane including the axis is detected as the gradient angle θR.

A flow chart of FIG. 15 illustrates a pad pressing force calculating routine executed in the fourth embodiment, namely, in place of step S17 of the first embodiment of FIG. 7. This pad pressing force calculating routine is initiated with step S201 to detect the gradient angle θR of the road surface on the basis of the output signal of the gradient angle sensor 320. Then, the control flow goes to step S202 to calculate the target values of the pad pressing force Ffr, Ffl, Frr, Frl of each wheel, as a function of the detected gradient angle OR. More specifically, the target values of the pad pressing forces Ffr, Ffl of the front right and left wheels FR, FL are calculated as:

$$Ffr=FF(\theta R)$$

$$Ffl=FF(\theta R)$$

The target values of the pad pressing forces Frr, Frl of the rear right and left wheels RR, RL are calculated as:

$$Frr=FR(\theta R)$$

$$Frl=FR(\theta R)$$

In the above equations, "FF(θR)" represents a coefficient for the front wheels, which changes as a function of the gradient angle θR. Similarly, "FR(θR)" represents a coefficient for the rear wheels, which changes as a function of the gradient angle θR.

The pad pressing force calculating routine of FIG. 15 may be executed in place of step S67 of the second embodiment of FIG. 8.

Figure 17:
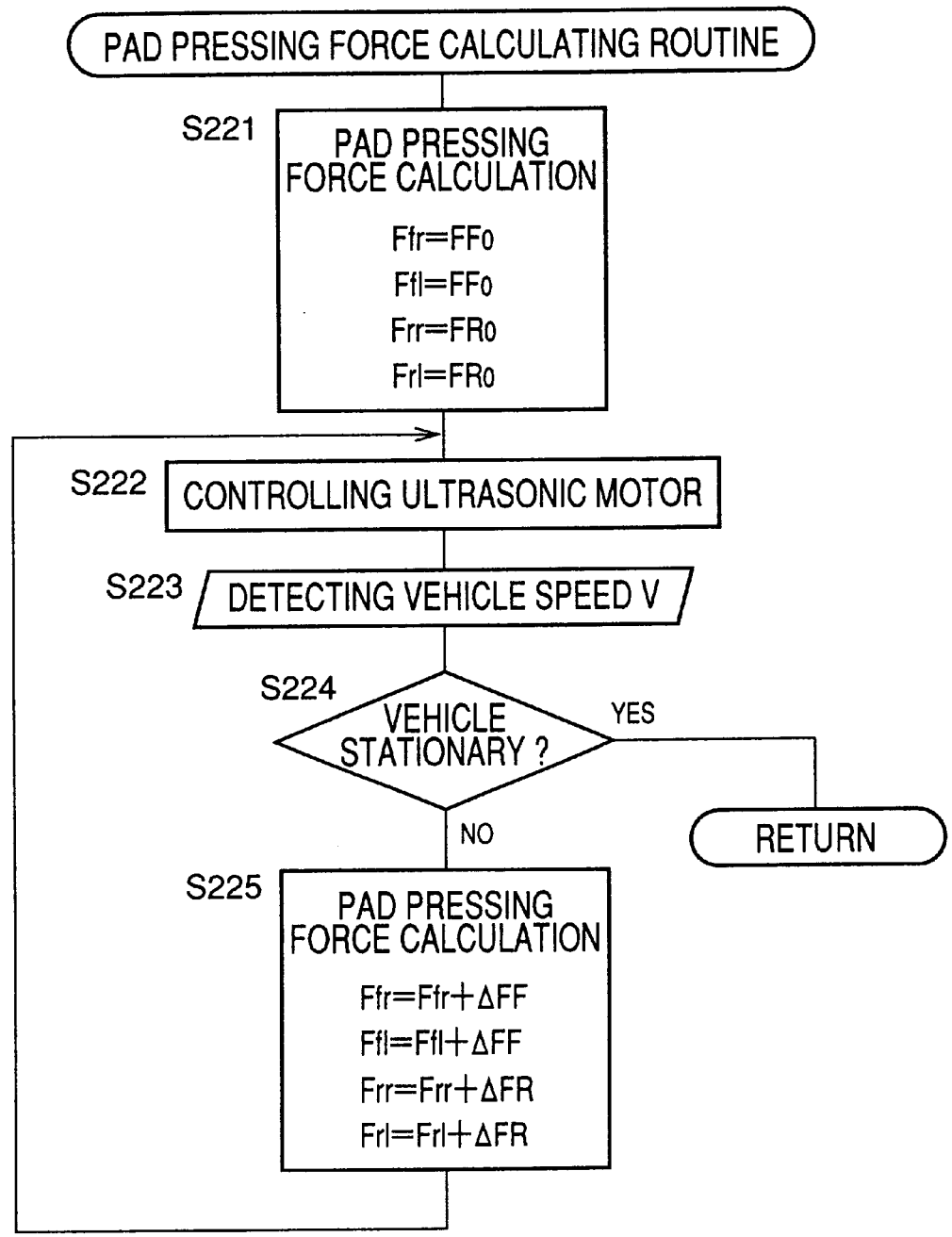
FIG. 17 is a flow chart illustrating a pad pressing force calculating routine executed in one step of a brake control routine executed according to a control program stored in a ROM of an electronic control unit used in a braking system including an electrically operated parking brake apparatus according to a fifth embodiment of the present invention.

Referring to FIG. 17, a fifth embodiment of this invention will be described. This fifth embodiment is similar to the first embodiment in many aspects, and is different therefrom in respect of only the brake control routine. Only the elements characteristic of the fifth embodiment will be described, with the same reference signs as used in the first embodiment being used to identify the corresponding or similar elements.

The first embodiment is adapted to operate the disc brakes 16 of the four wheels as the parking brakes when the ignition switch 222 is turned from the ON state to the OFF state. While the first embodiment is arranged to control the ultrasonic motors 14 for holding the pad pressing forces at the predetermined values FF, FR, the present fifth embodiment is arranged such that the pad pressing forces are increased from predetermined initial values to values sufficient to hold the vehicle stationary, that is, to values by which the vehicle can be held stationary on the particular road surface.

A pad pressing force calculating routine illustrated in the flow chart of FIG. 17 is executed in the fifth embodiment, that is, in place of step S17 of the first embodiment of FIG. 7.

The routine of FIG. 17 is initiated with step S221 in which the target values of the pad pressing forces Ffr, Ffl of the front right and left wheels FR, FL are determined to be a predetermined initial value FFo (constant), while the target values of the pad pressing forces Frr, Frl of the rear right and left wheels RR, RL are determined to be a predetermined initial value FRo (constant). Then, step S222 is implemented to control the ultrasonic motor 14 for wheel wheel, so as to established the target pressing forces. Step S222 is followed by step S223 to detect the vehicle running speed V on the basis of the output signal of the vehicle speed sensor 224. Step S223 is followed by step S224 to determine whether the vehicle is stationary. This determination is based on the detected vehicle speed V. If the detected vehicle speed V is lower than a predetermined threshold (a positive value close to zero), an affirmative decision (YES) is obtained in step S224. If not, a negative decision (NO) is obtained in step S224. If the affirmative decision (YES) is obtained in step S224, one cycle of execution of the routine is terminated. If the vehicle is not stationary or is still moving, the negative decision (NO) is obtained in step S224, and the control flow goes to step S225 in which the pad pressing forces Ffr, Ffl of the front right and left wheels FR, FL are incremented by a predetermined amount $\Delta FF$, while the pad pressing forces Frr, Frl of the rear right and left wheels RR, RL are incremented by a predetermined amount $\Delta FR$. Then, the control flow goes back to step S222.

Steps S222–S225 are repeatedly implemented until the affirmative decision (YES) is obtained in step S224, that is, until the pad pressing forces of the four wheels are increased to the values by which the vehicle can be held stationary.

The pad pressing force calculating routine of FIG. 17 may be executed in place of step S67 of the second embodiment of FIG. 8.

Figure 18:
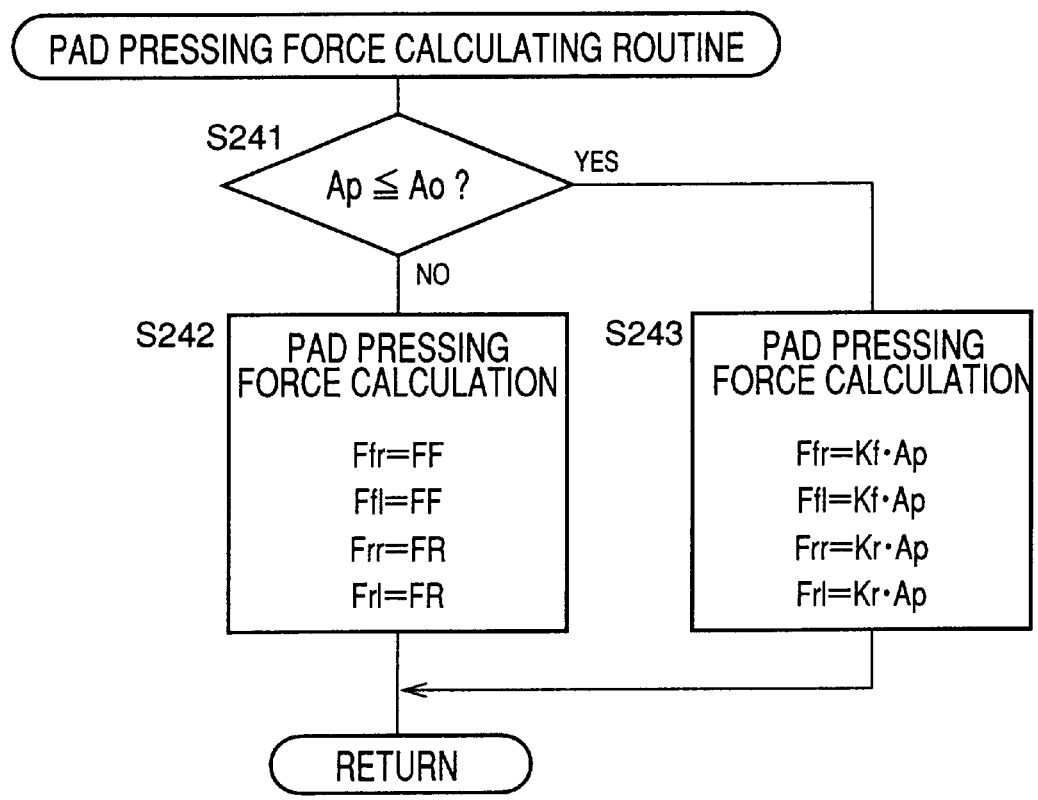
FIG. 18 is a flow chart illustrating a pad pressing force calculating routine executed in one step of a brake control routine executed according to a control program stored in a ROM of an electronic control unit used in a braking system including an electrically operated parking brake apparatus according to a sixth embodiment of the present invention.
Figure 19:
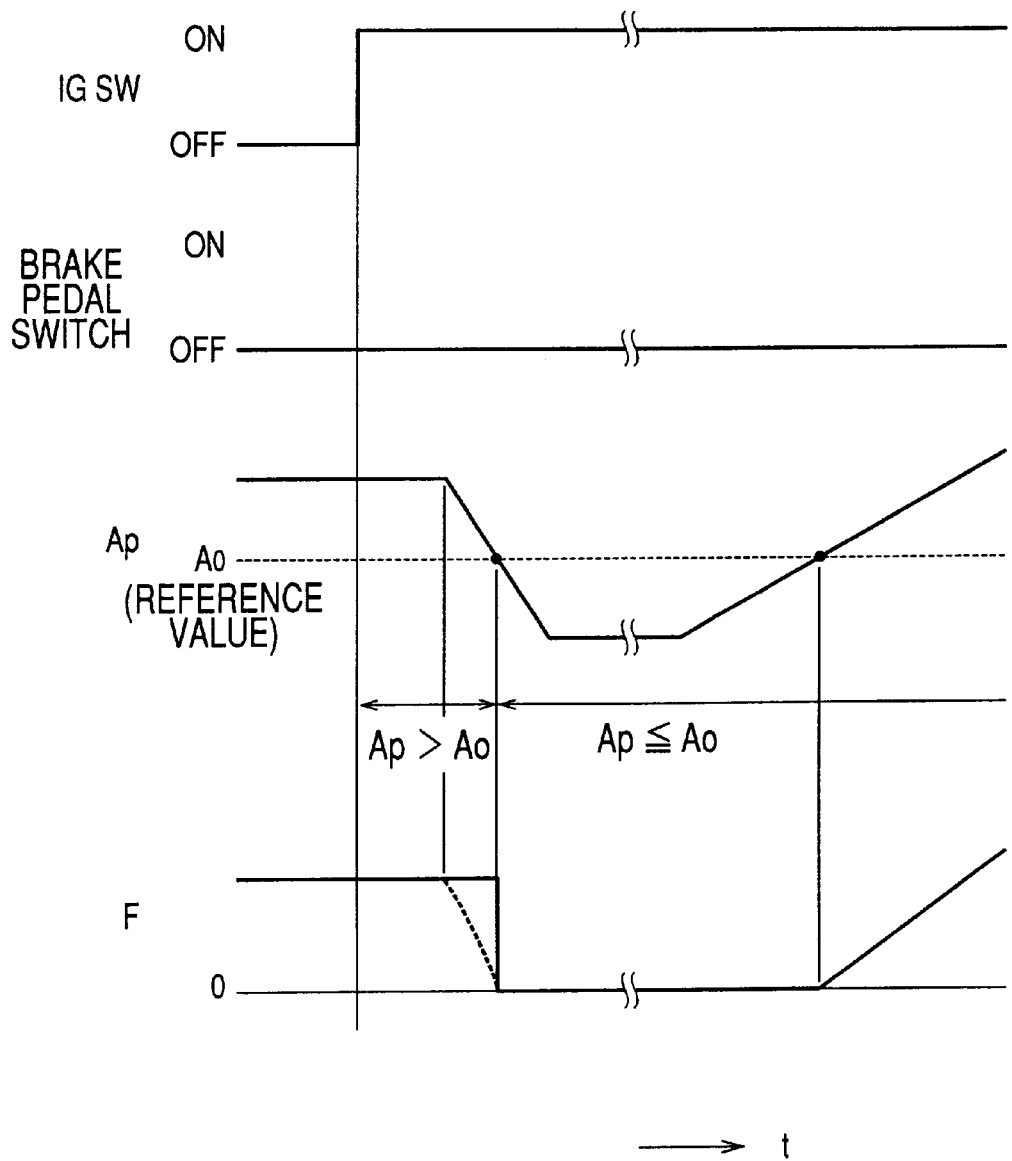
FIG. 19 is a time chart for explaining the pad pressing force calculating routine of FIG. 18.

Referring to FIGS. 18 and 19, a sixth embodiment of this invention will be described. This sixth embodiment is similar to the first embodiment in many aspects, and is different therefrom in respect of only the brake control routine. Only the elements characteristic of the sixth embodiment will be described, with the same reference signs as used in the first embodiment being used to identify the corresponding or similar elements.

In the first embodiment of FIGS. 1–7, the rotary operating member 172 of the parking brake operating device 154 must be turned counterclockwise to the non-operated position of FIG. 4 (at which the knob 174 extends upright), in order to release the parking brake applied to the vehicle while the ignition switch 222 is placed in the ON state. During an initial portion of this counterclockwise turning of the operating member 172, the pad pressing force F of each disc brake 16 gradually decreases with a decrease in the parking brake operating amount Ap (angle of rotation of the operating member 172), as indicated by broken line in the graph of FIG. 19. In the conventionally mechanically operated parking brake apparatus, the pad pressing force F abruptly decreases toward zero upon operation of the parking brake operating member to its non-operated or releasing position, owing to an automatic return mechanism associated with the parking brake operating member. For abruptly decreasing the pad pressing force F upon operation of the operating member 172 to release the parking brake, as in the conventional mechanically operated parking brake apparatus, the present sixth embodiment is adapted to control the ultrasonic motor 14 so that the pad pressing force F is held at the predetermined constant value FF, FR, irrespective of a decrease in the parking brake operating amount Ap, until the parking brake operating amount Ap of the parking brake operating device 154 once operated has decreased to a reference value Ao for the first time after the ignition switch 222 is turned ON (turned from the OFF state to the ON state), namely, so that the pad pressing force F is suddenly zeroed when the pad pressing force Ap has decreased to the reference value Ao. Thus, the rotary operating member 172 of the parking brake operating device 154 used to continuously change the parking brake operating amount Ap can be used as a switch for abruptly releasing the parking brake.

A pad pressing force calculating routine illustrated in the flow chart of FIG. 18 is executed in the sixth embodiment.

The pad pressing force calculating routine of FIG. 18 is initiated with step S241 to determine whether the parking brake operating amount Ap of the parking brake operating device 154 once operated has decreased to the reference value Ao for the first time after the ignition switch 222 is turned ON. If a negative decision (NO) is obtained in step S241, the control flow goes to step S242 in which the target values of the pad pressing forces Ffr, Ffl of the front wheels are calculated to be equal to the predetermined value FF, while the target values of the pad pressing forces Frr, Frl of the rear wheels are calculated to be equal to the predetermined value FR, as in step S17 of the first embodiment. If an affirmative decision (YES) is obtained in step S241, the control flow goes to step S244 in which the target values of the pad pressing forces Ffr, Ffl, Frr, Frl are calculated as a function of the parking brake operating amount Ap, as in step S8 of the first embodiment.

It is noted that step S242 may be replaced by the routine of FIG. 15 or 17. It is further noted that steps 55, 56 and 58 in the brake control routine of FIG. 8 may be replaced by the pad pressing force calculating routine of FIG. 18.

Figure 20:
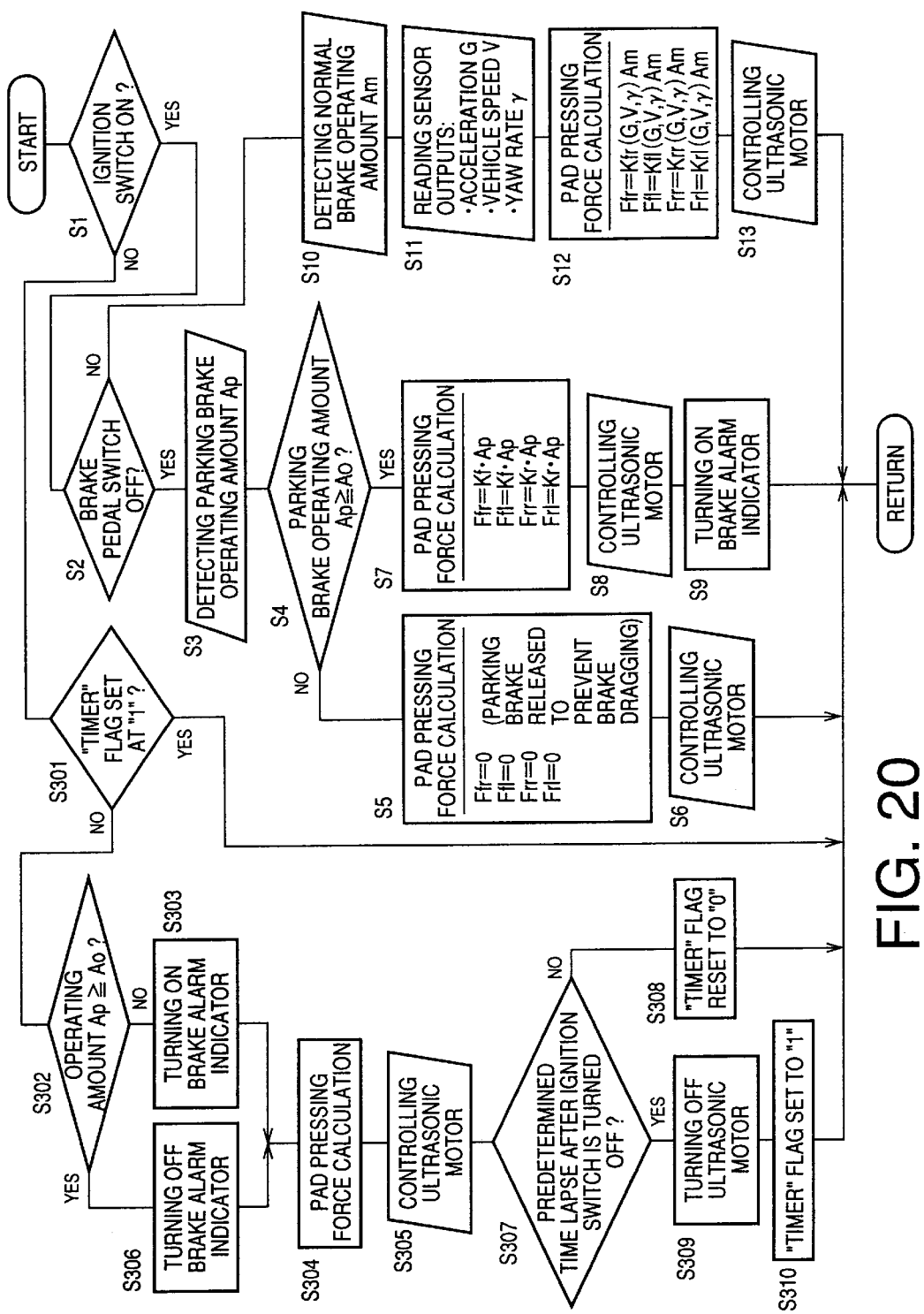
FIG. 20 is a flow chart illustrating a brake control routine executed according to a control program stored in a ROM of an electronic control unit used in a braking system including an electrically operated parking brake apparatus according to a seventh embodiment of the present invention.

Referring next to FIG. 20, a seventh embodiment of this invention will be described. This seventh embodiment is similar to the first embodiment in many aspects, and is different therefrom in respect of only the brake control routine. Only the elements characteristic of the seventh embodiment will be described, with the same reference signs as used in the first embodiment being used to identify the corresponding or similar elements.

In the first embodiment, the pad pressing force F while the parking brake releasing switch 156 is off cannot be changed by the vehicle operator after the ignition switch 222 is turned OFF. However, the present seventh embodiment is adapted to permit the vehicle operator to change the pad pressing force F by operating the parking brake operating device 154 for a predetermined period (e.g., 3–10 minutes) even after the ignition switch 222 is turned OFF. Thus, the parking brake apparatus in the present embodiment is improved in the usage or operating flexibility over the first embodiment.

A brake control routine in the present seventh embodiment is illustrated in the flow chart of FIG. 20. This brake control routine includes steps S1–S13 identical with steps S1 and S3–S14 of FIG. 1, respectively, and steps S302–S310 which are implemented in place of steps S15–S25. Only the steps S302–S310 will be described.

If the ignition switch 222 is in the OFF state, that is, if the negative decision (NO) is obtained in step S1, the control flow goes to step S301 to determine whether a TIMER flag is set at "1", that is, whether a predetermined time has passed after the ignition switch 222 is turned OFF. The TIMER flag is reset to "0" when the negative decision (NO) is obtained in step S1, namely, when the ignition switch 222 is turned OFF.

If a negative decision (NO) is obtained in step S301, the control flow goes to step S302 to detect the operating amount Ap of the parking brake operating device 154 on the basis of the angle sensor 198, and determine whether the parking brake operating amount Ap is equal to or larger than the reference value Ao, that is, whether a substantial parking brake is applied to the vehicle with the parking brake operating device 154 placed in an operated position.

If a negative decision (NO) is obtained in step S302, the control flow goes to step S303 to turn on the brake alarm indicator 250 (described above with respect to the first embodiment), in order to warn the vehicle operator that a parking brake as generally applied to the vehicle when the ignition switch 222 is in the OFF state is not applied to the vehicle. Step S303 is followed by step S304 in which the target values of the pad pressing forces Ffr, Ffl, Frr, Frl of the four wheels are calculated depending upon the operating amount Ap of the parking brake operating device 154. In this specific case wherein the parking brake operating amount Ap is smaller than the reference value Ao, the target value of each pad pressing force Ffr, Ffl, Frr, Frl is determined to be zero. Then, step S305 is implemented to control the ultrasonic motor 14 for each wheel so as to establish the target value of the pad pressing force. In this specific case, the actual pad pressing force of each wheel is zeroed, so that the disc brake 16 of each wheel is placed in the non-operated position.

If an affirmative decision (YES) is obtained in step S302, the control flow goes to step S306 to turn off the brake alarm indicator 250, and then to step S304 in which the target values of the pad pressing force Ffr, Ffl, Frr, Frl of each wheel is determined on the basis of the detected parking brake operating amount Ap. In this specific case wherein the parking brake operating amount Ap is larger than the reference value Ao, the target value obtained in step S304 is larger than zero. Then, step S304 is implemented to control the ultrasonic motor 14 so that the actual value of each pad pressing force coincides with the target value, whereby the disc brake 16 of each wheel is operated as the parking brake.

In either of the two cases indicated above, step S305 is followed by step S307 to determine whether the predetermined time has lapsed after the ignition switch 222 is turned OFF. If a negative decision (NO) is obtained in step S307, the control flow goes to step S308 in which the TIMER flag is held at "0". Thus, the pad pressing force F of each disc brake 16 serving as the parking brake can be changed by operating the parking brake operating device 154 even after the ignition switch 222 is turned OFF.

If an affirmative decision (YES) is obtained as a result of elapsing of the predetermined time after the ignition switch 222 is turned OFF, during repeated implementation of steps S1 and S301–S308, the control flow goes to step S309 to turn OFF the ultrasonic motor 14, so that the vehicle is held stationary with the holding torque generated by the ultrasonic motor 14. Then, step S310 is implemented to set the TIMER flag to "1". In the next cycle of execution of the present routine, an affirmative decision (YES) is obtained in step S301, and one cycle of execution of the routine is terminated. Thereafter, only steps S3 and S301 are repeatedly implemented until the ignition switch 222 is again turned ON. This arrangement is effective to save the amount of consumption of the electric energy by the electronic brake control unit 220.

It is noted that the electronic brake control unit 220 is placed in the energy saving mode while the TIMER flag is set at "1", and that the energy saving mode is cancelled when the TIMER flag is reset to "0", that is, when the ignition switch 222 is turned OFF. Thus, the TIMER flag also functions as a flag for establishing and cancelling the energy saving mode of the electronic brake control unit 220.

It will be understood from the above description of the seventh embodiment that the parking brake operating device 154 and a portion of the electronic brake control unit 220 assigned to implement step S304 cooperate to constitute a manually operated target operating force designating device for designating the target value of the operating force of the disc brake 16, and that a portion of the electronic brake control unit 220 assigned to implement step S304 constitutes second motor control means for controlling the ultrasonic motor 14 such that the actual value of the operating force of the disc brake 16 coincides with the designated target value. It will also be understood that a portion of the control unit 220 assigned to implement steps S301 and S307–S310 constitutes power supply inhibiting an electric power supply to the electric motor 14 after the ignition switch 222 is turned OFF.

While the predetermined time used in step S307 is a fixed value in the seventh embodiment, this time may be a variable that can be changed by the vehicle operator.

Figure 22:
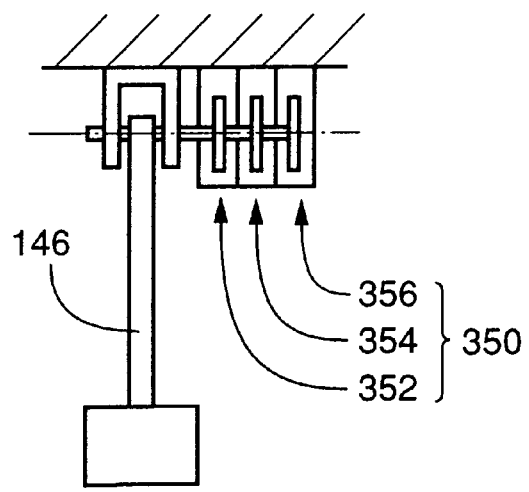
FIG. 22 is a front elevational view showing the brake pedal and an operating stroke detecting device in the embodiment of FIG. 21.
Figure 23:
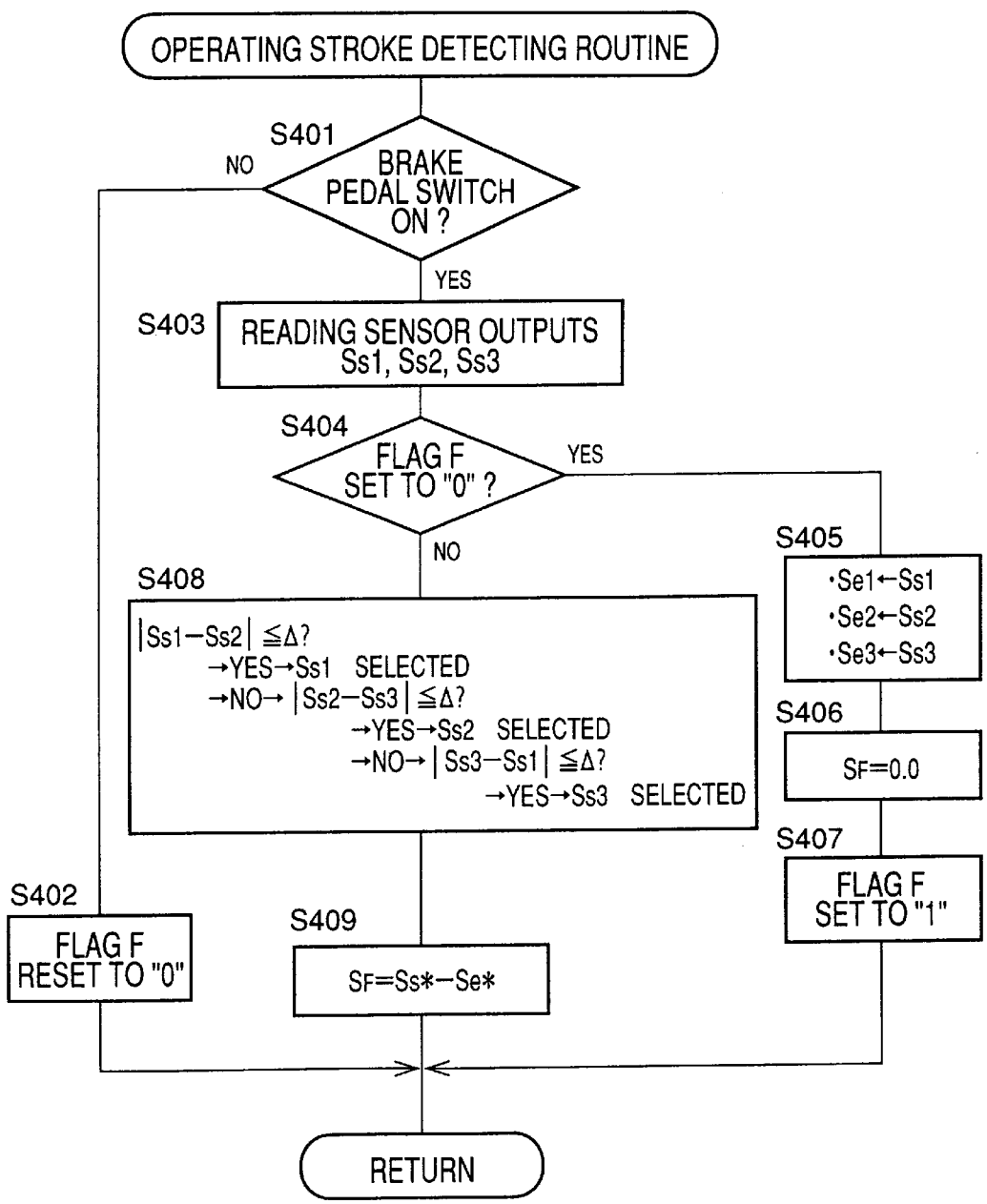
FIG. 23 is a flow chart illustrating an operating stroke detecting routine executed according to a control program stored in a ROM of an electronic brake control unit used in the eighth embodiment.

Referring next to FIGS. 21–23, an eighth embodiment of this invention will be described. This eighth embodiment is similar to the first embodiment in many aspects, and is different therefrom in respect of only a technique for detecting an operating stroke of the brake pedal 146. Only the elements characteristic of the eighth embodiment will be described, with the same reference signs as used in the first embodiment being used to identify the corresponding or similar elements.

The brake pedal 146 and the related mechanical elements used in the present eighth embodiment are shown in FIG. 21. The brake pedal 146 is attached at its fixed end to the vehicle body such that the brake pedal 146 is pivotable about an axis extending in the transverse or lateral direction of the vehicle. The brake pedal 146 is connected at an intermediate portion thereof to the end portion of the link member 150 of the reaction force generating mechanism 148 through a clevis 338, such that the brake pedal 146 and the link member 150 are pivotable relative to each other. The brake pedal 146 is biased by a return spring 340 in the counterclockwise direction (as seen in FIG. 21) toward its non-operated position, which is determined by abutting contact of the brake pedal 146 with a stopper 342 which is fixed to the vehicle body through an attaching member 344. The attaching member 344 includes a screw mechanism capable of changing the position of abutting contact of the stopper 342 with the brake pedal 146. The brake pedal switch 234 indicated above generates a signal whose level changes in two steps depending upon whether the brake pedal 146 is placed in it non-operated position or not.

An operating stroke detecting device 350 is provided for detecting the operating stroke of the brake pedal 146. This detecting device 350 is disposed coaxially with the pivot axis of the brake pedal 146. The operating stroke detecting device 350 is adapted to detect an angle of pivotal movement of the brake pedal 146 as the operating stroke of the brake pedal.

During manufacture or assembly of the vehicle, the nominal non-operated position of the brake pedal 146 is established by the screw mechanism of the attaching member 344 for the stopper 342. However, the actual non-operated position of the brake pedal 146 may deviate from the nominal position. In this case, the output of the operating stroke detecting device 350 when the brake pedal 146 is placed in the actual non-operated position does not corresponds to the zero value of the operating stroke of the brake pedal 146. If the pad pressing force F is controlled on the basis of the output of the detecting device 350 in the above case, the pad pressing force F during a normal brake application cannot be accurately controlled depending upon the actual operating stroke of the brake pedal 146. In view of this drawback, the present eighth embodiment is arranged to permit calibration of the operating stroke detecting device 350 such that the operating stroke of the brake pedal 146 detected by the detecting device 350 in the actual non-operated position of the brake pedal 146, namely, when the brake pedal switch 234 is turned ON, is subtracted as an error value from the operating stroke as detected by the detecting device 350 during operation of the brake pedal 146 with the brake pedal switch 234 being ON, so that the difference is used as a value representing the actual operating stroke.

If the operating stroke detecting device 350 has only one sensor, the detecting device fails to operate and the pad pressing force cannot be controlled, in the event of some failure of that sensor. To avoid this, the detecting device 350 has three stroke sensors, that is, a first sensor 352, a second sensor 354 and a third sensor 356, as shown in FIG. 22. These three sensors 352, 354, 356 are disposed in series and coaxially with each other in alignment with the axis of pivotal movement of the brake pedal 146. The present embodiment is based on an assumption that at least two of the three sensors 352, 354, 356 are simultaneously or always normal. This assumption is based on a very low possibility that all of the three sensors 352, 354, 356 are simultaneously defective, and a relatively low possibility that two of these three sensors are simultaneously defective. In the present embodiment, the absolute values of the outputs of the selected two sensors of the three sensors 352, 354, 356 are compared with each other. If the absolute value of the difference is substantially zero, the two sensors involved can be considered to be normal. If the absolute value of the difference is not substantially zero, on the other hand, one of the two sensors can be considered to be defective while the other sensor can be considered to be normal. The comparison is repeated until the absolute value of the difference is substantially zero. One of the outputs of the two sensors whose difference is substantially zero is used for calculating the operating stroke of the brake pedal 146. The operating stroke detecting device 350 used in the present embodiment has improved operating reliability. The concept of detection indicated above may be considered to be based on a decision by majority wherein if the output of one of the three sensors is different from those of the other two sensors which are substantially equal to each other, these other two sensors are decided to be normal while the above-indicated one sensor is abnormal or defective.

The present eighth embodiment is adapted to execute an operating stroke detecting routine illustrated in the flow chart of FIG. 23, according to a control program stored in the ROM of the electronic brake control unit 220.

The routine of FIG. 23 is initiated with step S401 to determine whether the brake pedal switch 234 is in the ON state. If a negative decision (NO) is obtained in step S401, the control flow goes to step S402 to reset a flag F to "0". Thus, one cycle of execution of the routine is terminated.

If the brake pedal switch 234 is turned ON as a result of an operation of the brake pedal 146, an affirmative decision (YES) is obtained in step S401. In this case, the control flow goes to step S403 to read the outputs Ss1, Ss2 and Ss3 of the first, second and third sensors 352, 354, 356. Step S403 is followed by step S404 to determine whether the flag F is set at "0". If an affirmative decision (YES) is obtained in step S404, the control flow goes to step S405 to set the outputs Ss1, Ss2 and Ss3 of the first, second and third sensors 352, 354, 356 as error values Se1, Se2 and Se3 of the respective first, second and third sensors 352, 354, 356. Then, step S406 is implemented to determine that an operating stroke SF of the brake pedal 146 is zero. Step S406 is followed by step S407 to set the flag F to "1". Thus, one cycle of execution of the routine is terminated.

In the next cycle of execution of the routine, a negative decision (NO) is obtained in step S404 since the flag F has been set to "1" in step S407 of the last cycle of execution, whereby the control flow goes to step S408 to effect a first determination as to whether the absolute value of the difference between the outputs Ss1 and Ss2 is equal to or smaller than a predetermined threshold $\Delta$ which is close to zero. If an affirmative decision (YES) is obtained in this first determination, the output Ss1 of the first sensor 352 is selected as a reliable output Ss* of the operating stroke detecting device 350. If a negative decision (NO) is obtained in the first determination, a second determination as to whether the absolute value of the difference between the outputs Ss2 and Ss3 is equal to or smaller than the threshold $\Delta$. If an affirmative decision (YES) is obtained in this second determination, the output Ss2 of the second sensor 354 is selected as the reliable output Ss* of the detecting device 350. If a negative decision (NO) is obtained in the second determination, a third determination as to whether the absolute value of the difference between the outputs Ss3 and Ss1 is equal to or smaller than the threshold $\Delta$. If an affirmative decision (YES) is obtained in this third determination, the output Ss3 is selected as the reliable output Ss* of the detecting device 350.

Then, the control flow goes to step S409 in which the operating stroke SF of the brake pedal 146 is obtained by subtracting, from the reliable output Ss* selected in step S408, an error value Se* which is the error value Se1, Se2, Se3 of the sensor 352, 354, 356 whose output Ss1, Ss2, Ss3 has been selected as the reliable output Ss*. Thus, one cycle of execution of the routine is terminated.

While the several presently preferred embodiments of the present invention have been described above in detail by reference to the accompanying drawings, it is to be understood that the present invention may be embodied with various changes, modifications or improvements, which may occur to those skilled in the art, without departing from the spirit and scope of the invention defined in the following claims:

What is claimed is:

1. An electrically operated parking brake apparatus for an automotive vehicle having a drive power source, a plurality of wheels including at least one drive wheel driven by said drive power source, and a manually operated drive power source switch having an operated position in which said drive power source is in operation and a non-operated position in which said drive power source is not in operation, said parking brake apparatus comprising (a) a parking brake device provided for each of at least one of said plurality of wheels, (b) an electrically operated driving unit for activating said parking brake device with electric power, (c) an operating force holding mechanism for mechanically maintaining an operating force of said parking brake device while said electrically operated driving unit is placed in an off state with no electric power supplied thereto, and (d) a parking brake control device for supplying electric power to said electrically operated driving unit to activate said parking brake device, and then cutting a supply of the electric power from said electrically operated driving unit, for thereby applying a parking brake to the automotive vehicle, wherein an improvement comprises:

said parking brake control device comprising an actual operating force changing device operable while said drive power source switch is placed in said non-operated position, for supplying electric power to said electrically operated driving unit so as to change an actual value of said operating force of said parking brake device, and then cutting a supply of the electric power from said electrically operated driving unit.

2. An electrically operated parking brake apparatus according to claim 1, further comprising a parking brake control member, and wherein said parking brake control device is responsive to an operation of said parking brake control member.

3. An electrically operated parking brake apparatus according to claim 1, wherein said parking brake control device is responsive to an operation of said drive power source switch from said operated position to said non-operated position.

4. An electrically operated parking brake apparatus according to claim 1, wherein said parking brake control device includes power supply inhibiting means operable while said drive power source switch is in said non-operated position, for inhibiting the supply of the electric power to said electrically operated driving unit after said supply is cut, until an operation by an operator of the automotive vehicle to change said actual value of the operating force of said parking brake device is performed.

5. An electrically operated parking brake apparatus according to claim 1, wherein said actual operating force changing device includes (a) a parking brake control member, and (b) power supply means for supplying said controlled electric power to said electrically operated driving unit, depending upon an operation of said parking brake control member.

6. An electrically operated parking brake apparatus according to claim 1, wherein said actual operating force changing device includes (a) a manually operated parking brake releasing switch for zeroing the automotive vehicle to zero the actual value of the operating force of said parking brake device, and (b) first control means for controlling said electrically operated driving unit to place said parking brake device in a non-operated position, upon an operation of said parking brake releasing switch while said drive power source switch is placed in said non-operated position.

7. An electrically operated parking brake apparatus according to claim 6, wherein said first control means is operated where said parking brake releasing switch is operated substantially simultaneously with an operation of said drive power source switch from said operated position to said non-operated position.

8. An electrically operated parking brake apparatus according to claim 1, wherein said actual operating force changing device includes (a) a manually operated target operating force designating device for designating a target value of said operating force of said parking brake device, and (b) second control means for controlling said electrically operated driving unit (14) such that said actual value of the operating force of said parking brake device while said drive power source switch is in said non-operated position is substantially equal to said target value designated by said manually operated target operating force designating device.

9. An electrically operated parking brake apparatus according to claim 8, wherein said actual operating force changing device includes actual operating force holding means for holding said actual value of the operating force of said parking brake device, irrespective of a change of said target value by said target operating force designating device, until said target value of said operating force for the first time after said drive power source switch is brought to said operated position from said non-operated position has decreased to a predetermined reference value.

10. An electrically operated parking brake apparatus according to claim 1, wherein said actual operating force changing device is operable to change the actual value of the operating force of said parking brake device at any time while said drive power source switch is placed in said non-operated position.

11. An electrically operated parking brake apparatus according to claim 1, wherein said actual operating force changing device includes power supply inhibiting means for inhibiting said supply of the electric power to said electrically operated driving unit after a predetermined time has elapsed after said drive power source switch is brought to said non-operated position.

12. An electrically operated parking brake apparatus according to claim 1, wherein said actual operating force changing device includes (a) a parking brake operating device, (b) actual operating force changing means operable while said drive power source switch is placed in said non-operated position, for supplying controlled electric power to said electrically operated driving unit, on the basis of an operation of said parking brake operating device, so as to change said actual value of the operating force of said parking device, and then cutting a supply of said controlled electric power from said electrically operated driving unit, and (c) power supply inhibiting means for inhibiting said supply of said controlled electric power to said electrically operated driving unit, irrespective of the operation of said parking brake operating device, after a predetermined time has elapsed after said drive power source switch is turned to said non-operated position, and until said drive power source switch is turned from said non-operated position to said operated position.

13. An electrically operated parking brake apparatus according to claim 1, further comprising an operating force sensor for detecting the actual value of the operating force of the parking brake device, and wherein the actual operating force changing device further comprises third control means for controlling the electrically operated driving unit such that the actual value detected by the operating force sensor is substantially equal to a target value.

14. An electrically operated parking brake apparatus according to claim 1, wherein the actual operating force changing device comprises (a) an automatic target operating force determining device for determining a target value of the operating force of the parking brake depending upon a condition of the automotive vehicle or a road surface on which the automotive vehicle lies, and (b) fourth control means operable while the drive power source switch is placed in the non-operated position, for controlling the electrically operated such that the actual value of the operating force is substantially equal to the target value determined by the automatic target operating force determining device.

15. An electrically operated parking brake apparatus according to claim 14, wherein the automatic target operating force determining device includes (a) a vehicle speed sensor for detecting a running speed of the automotive vehicle, and (b) target operating force increasing means for increasing the target value if a determination that the automatic vehicle is not stationary is made on the basis of the running speed of the automatic vehicle detected by the vehicle speed sensor.

16. An electrically operated parking brake apparatus according to claim 14, wherein the automatic target operating force determining device includes (a) a road gradient sensor for detecting a gradient angle of the road surface, and (b) target operating force determining means for determining the target value, on the basis of the gradient angle detected by the road gradient sensor, so as to prevent the automotive vehicle from moving on the road surface.

17. An electrically operated parking brake apparatus according to claim 1, wherein said parking brake device and said electrically operated driving unit are used for a sole purpose of applying the parking brake to the automotive vehicle.

18. An electrically operated parking brake apparatus according to claim 1, further comprising a brake operating member for applying a normal brake to the automotive vehicle, and wherein said electrically operated driving unit is operated in response to an operation of said brake operating member, to activate said parking brake device for applying said normal brake.

19. An electrically operated parking brake apparatus according to claim 1, wherein said electrically operated driving unit is an electric motor which generates a holding torque while said electric motor is placed in an off state with no electric power supplied thereto, and said operating force holding mechanism includes a portion of said electric motor which generates said holding torque.

20. An electrically operated parking brake apparatus according to claim 19, wherein said electric motor is an ultrasonic motor.

21. An electrically operated parking brake apparatus according to claim 1, wherein said electrically operated driving unit includes an electric motor, and said operating force holding mechanism includes a one-way power transmitting mechanism disposed between said electric motor and said parking brake device, said one-way power transmitting mechanism permitting an output force of said electric motor to be transmitted to said parking brake device and inhibiting a force to be transmitted from said parking brake device to said electric motor.

22. An electrically operated parking brake apparatus according to claim 21, wherein the one-way power transmitting mechanism includes a worm rotated by said electric motor, and a worm wheel connected to said parking brake device and engaging said worm.

23. An electrically operated parking brake apparatus according to claim 1, wherein said parking brake device, the electrically operated driving unit and said operating force holding mechanism are provided for each of the plurality of wheels, and said parking brake control device includes a parking brake mode selecting device for selecting one of a plurality of parking brake modes which use respective different combinations of the parking brake devices that are substantially simultaneously activated for respective ones of said plurality of wheels.

24. An electrically operated parking brake apparatus for an automotive vehicle having a plurality of wheels, said parking brake apparatus comprising (a) a plurality of parking brake devices provided for said plurality of wheels, respectively, (b) a plurality of electrically operated driving units for activating said parking brake devices, respectively, and (c) a parking brake control device for supplying electric power to said electrically operated driving units to activate said parking brake devices, for thereby applying a parking brake to the automotive vehicle, wherein an improvement comprises:

said parking brake control device comprising a parking brake mode selecting device for selecting one of a plurality of parking brake modes which use respective different combinations of said plurality of the parking brake devices that are substantially simultaneously activated for respective ones of said plurality of wheels.

25. An electrically operated parking brake apparatus according to claim 24, wherein said parking brake mode selecting device includes (a) a manually operated member for selecting one of said plurality of parking brake modes, and (b) manual type selecting means responsive to an operation of said manually operated member, for selecting said one of said plurality of parking brake modes.

26. An electrically operated parking brake apparatus according to claim 24, wherein said parking brake mode selecting device includes (a) a vehicle motion state sensor for detecting a physical quantity representative of a motion state of the automotive vehicle, and (b) automatic type selecting means for selecting one of said plurality of parking brake modes, on the basis of the physical quantity detected by said vehicle motion state sensor.

27. An electrically operated parking brake apparatus according to claim 24, wherein said plurality of wheels consist of a front left wheel, a front right wheel, a rear left wheel and a rear right wheel, and said plurality of combinations include a first combination consisting of said front left and right wheels and said rear left and right wheels, and a second combination consisting of said rear left and right wheels.

28. An electrically operated parking brake apparatus according to claim 27, wherein said parking brake mode selecting device selects said second combination when said physical quantity detected by said vehicle motion state sensor indicates a desire of an operator of the automotive vehicle to spin-turn the automatic vehicle by applying a brake to each of said rear left and right wheels, and selects said first combination when said physical quantity does not indicates said desire.

29. An electrically operated parking brake apparatus according to claim 27, wherein said vehicle motion state sensor includes at least one of a steering angle sensor for detecting a steering angle of the automatic vehicle and a vehicle speed sensor for detecting a running speed of the automotive vehicle, and said parking brake mode selecting device includes determining means for determining that the operator of the automotive vehicle has said desire, if at least one of the following conditions is satisfied: 1) an absolute value of said steering angle is larger than a predetermined threshold; 2) an absolute value of a rate of change of said steering angle is higher than a predetermined threshold; and 3) said running speed of the automotive vehicle is lower than a predetermined threshold.

30. A braking amount detecting device for detecting a commanded braking amount relating to an operation of a braking apparatus, comprising:

three sensors for detecting respective three values each representing said commanded braking amount; and a braking amount determining means for determining if at least two values of said three values substantially simultaneously detected by said three sensors substantially coincide with each other, and if said at least two values substantially coincide with each other, determining one of said at least two values or a value represented by said at least two values, as a reliable value of said commanded braking amount.

31. A braking amount detecting device according to claim 30, wherein said value represented by said at least two values of said three values is an average of said at least two values.

32. A braking amount detecting device according to claim 30, wherein said three values detected by said three sensors, respectively, consist of three values of a same physical quantity.

33. A braking amount detecting device according to claim 30, wherein said three values detected by said three sensors, respectively, include at least two values of different physical quantities which relate to each other.

34. An electrically operated parking brake apparatus for an automotive vehicle having a drive power source, a plurality of wheels including at least one drive wheel driven by said drive power source, and a manually operated drive power source switch having an operated position in which said drive power source is in operation and a non-operated position in which said drive power source is not in operation, said parking brake apparatus comprising (a) a parking brake device provided for each of at least one of said plurality of wheels, (b) an electrically operated driving unit for activating said parking brake device, and (c) a parking brake control device for supplying electric power to said electrically operated driving unit to activate said parking brake device, for thereby applying a parking brake to the automotive vehicle, wherein an improvement comprises:

said parking brake control device comprising an actual operating force changing device operable while said drive power source switch is placed in said non-operated position, for supplying electric power to said electrically operated driving unit so as to change an actual value of an operating force of said parking brake device.

* * * * *